United States Patent
Rommer et al.

(10) Patent No.: US 10,560,914 B2
(45) Date of Patent: Feb. 11, 2020

(54) TRACKING AREA AND USER PLANE MAPPING FOR CONTROL PLANE/USER PLANE SPLIT

(71) Applicant: Telefonaktiebolaget LM Ericsson (publ), Stockholm (SE)

(72) Inventors: Stefan Rommer, Västra Frölunda (SE); Jan Backman, Kärna (SE); Peter Ramle, Mölnlycke (SE); Gunnar Rydnell, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/069,618

(22) PCT Filed: Nov. 10, 2016

(86) PCT No.: PCT/EP2016/077366
§ 371 (c)(1),
(2) Date: Jul. 12, 2018

(87) PCT Pub. No.: WO2017/125179
PCT Pub. Date: Jul. 27, 2017

(65) Prior Publication Data
US 2019/0014550 A1 Jan. 10, 2019

Related U.S. Application Data

(60) Provisional application No. 62/279,939, filed on Jan. 18, 2016.

(51) Int. Cl.
*H04W 60/04* (2009.01)
*H04L 12/24* (2006.01)
(Continued)

(52) U.S. Cl.
CPC ............. *H04W 60/04* (2013.01); *H04L 41/12* (2013.01); *H04W 8/02* (2013.01); *H04W 36/12* (2013.01);
(Continued)

(58) Field of Classification Search
CPC ....... H04W 60/04; H04W 8/02; H04W 48/17; H04W 36/12; H04W 36/385; H04W 88/14; H04W 36/32; H04L 41/12
See application file for complete search history.

(56) References Cited

U.S. PATENT DOCUMENTS

| 2004/0053607 A1* | 3/2004 | Ronneke | .................. H04L 47/10 455/422.1 |
| 2012/0207013 A1* | 8/2012 | Kamalaraj | ............. H04W 8/065 370/218 |

(Continued)

FOREIGN PATENT DOCUMENTS

WO   WO-2017110650 A1 *  6/2017   ............ H04W 88/16

OTHER PUBLICATIONS

ZTE et al., "Solution to Maintain existing TAI list allocation support," Nov. 16-20, 2015 USA, SA WG2 Meeting #112, S2-153902, pp. 1-2 (Year: 2015).*

(Continued)

*Primary Examiner* — Un C Cho
*Assistant Examiner* — Lalita W Pace
(74) *Attorney, Agent, or Firm* — Withrow & Terranova, PLLC

(57) ABSTRACT

Systems and methods relating to a cellular communications system having an architecture in which Serving Gateway (SGW) user plane functionality is separated from SGW control plane functionality are disclosed. In some embodiments, a cellular communications system having an architecture in which SGW user plane functionality is separated (Continued)

from SGW control plane functionality comprises a Serving Gateway Control plane entity (SGW-C) partitioned into a plurality of virtual SGW-Cs that correspond to a respective plurality of SGW User Plane (SGW-UP) service areas. The cellular communications system further comprises a plurality of SGW-UP pools each comprising one or more SGW User entities (SGW-Us), wherein each SGW-UP pool serves a respective one of the plurality of SGW-UP service areas. In this manner, the coordination problem between Tracking Areas (TAs) and the SGW-UP service areas is avoided.

5 Claims, 12 Drawing Sheets

(51) Int. Cl.
  *H04W 36/38* (2009.01)
  *H04W 48/00* (2009.01)
  *H04W 36/12* (2009.01)
  *H04W 8/02* (2009.01)
  *H04W 36/32* (2009.01)
  *H04W 88/14* (2009.01)

(52) U.S. Cl.
  CPC ......... *H04W 36/385* (2013.01); *H04W 48/17* (2013.01); *H04W 36/32* (2013.01); *H04W 88/14* (2013.01)

(56) References Cited

U.S. PATENT DOCUMENTS

| | | | | |
|---|---|---|---|---|
| 2013/0121298 A1* | 5/2013 | Rune | ................. | H04L 29/12066 370/329 |
| 2013/0308526 A1 | 11/2013 | Jaiswal et al. | | |
| 2015/0120941 A1 | 4/2015 | Ramankutty et al. | | |
| 2016/0128020 A1* | 5/2016 | Agarwal | ............... | H04W 68/04 370/328 |
| 2016/0295476 A1 | 10/2016 | Bi et al. | | |
| 2017/0126618 A1* | 5/2017 | Bhaskaran | .......... | H04L 61/2007 |
| 2017/0332278 A1* | 11/2017 | Fujinami | ............... | H04W 28/08 |
| 2018/0295659 A1* | 10/2018 | Shan | ..................... | H04W 76/11 |

OTHER PUBLICATIONS

Lim et al., "MIBlet, logically partitioned resource controller, in SNMP/SMI and CORBA for open switching architecture," ATM 2000. Proceedings of the Conference on High Performance Switching and Routing, Heidelberg, Germany, 2000, pp. 113-116 (Year: 2000).*

Author Unknown, "Technical Specification Group Services and System Aspects; Study on control and user plane separation of EPC nodes (Release 14)," Technical Report 23.714, Version 0.2.0, 3GPP Organizational Partners, Nov. 2015, 24 pages.

Author Unknown, "Technical Specification Group Services and System Aspects; Architecture enhancements for control and user plane separation of EPC nodes; Stage 2 (Release 14)," Technical Specification 23.214, Version 14.0.0, 3GPP Organizational Partners, Sep. 2016, 65 pages.

Cisco, et al., "S2-154422: Solution to key issue# 3: Control plane changing the user plane session identity," Third Generation Partnership Project (3GPP), SA WG2 Meeting #112, Nov. 16-20, 2015, 3 pages, Anaheim, USA.

International Search Report and Written Opinion for International Patent Application No. PCT/EP2016/077366, dated Mar. 23, 2017, 18 pages.

Decision of Refusal for Japanese Patent Application No. 2018-537483, dated Sep. 6, 2019, 9 pages.

Examination Report for European Patent Application No. 16797498.9, dated Oct. 14, 2019, 9 pages.

* cited by examiner

*(reproduced from 3GPP TR 23.714 version 0.2.0, Clause 6.3.1)*

TRACKING AREA AND USER PLANE MAPPING FOR CONTROL PLANE/USER PLANE SPLIT

RELATED APPLICATIONS

This application is a 35 U.S.C. § 371 national phase filing of International Application No. PCT/EP2016/077366, filed Nov. 10, 2016, which claims the benefit of provisional patent application Ser. No. 62/279,939, filed Jan. 18, 2016, the disclosures of which are hereby incorporated herein by reference in their entireties.

TECHNICAL FIELD

The present disclosure relates to a cellular communications system and, in particular, to a cellular communications system in which user plane functionality is separated from control plane functionality in a Serving Gateway (SGW)/Packet Data Network (PDN) Gateway (PGW).

BACKGROUND

In the Third Generation Partnership Project (3GPP) System Architecture (SA) Working Group Stage 2 Meeting #112 (SA2#112), it was pointed out that there may be an issue related to the Tracking Area Identity (TAI)—List handling in the Mobility Management Entity (MME) (see 3GPP Technical Report (TR) 23.714, clause 6.1.1.7). With the user plane functionality separation from the control plane functionality in the Evolved Packet Core (EPC) Serving Gateway (SGW)/Packet Data Network (PDN) Gateway (PGW), multiple EPC SGW/PGW user plane functional entities (referred to herein as SGW-Us) may be controlled by a single SGW/PGW control plane functional entity (referred to herein as a SGW-C). Therefore, the MME will be unable to assess if the Tracking Area (TA) that the User Equipment device (UE) is currently entering can be added to the TAI List of the UE (also referred to herein as a TA list).

The problem is actually more general than just handling the TAI List in the MME, and the issue coincides with problem of assessing if the SGW-U needs to be re-allocated at mobility to a new TA. In other words, the question becomes whether the new TA is served by the SGW-U currently allocated by the SGW-C or not. The issue is illustrated in FIG. 1. When the UE moves from TA2 to TA4, the MME cannot know if the new TA (i.e., TA4) is served by the same SGW-U or not and cannot know if the new TA (i.e., TA4) can be added to the TAI List of the UE. As such, there is a need for a system and methods that address these problems.

SUMMARY

Systems and methods relating to a cellular communications system having an architecture in which Serving Gateway (SGW) user plane functionality is separated from SGW control plane functionality are disclosed. In some embodiments, a cellular communications system having an architecture in which SGW user plane functionality is separated from SGW control plane functionality comprises a SGW control plane entity (SGW-C) partitioned into a plurality of virtual SGW-Cs that correspond to a respective plurality of SGW user plane (SGW-UP) service areas. The cellular communications system further comprises a plurality of SGW-UP pools each comprising one or more SGW user entities (SGW-Us), wherein each SGW-UP pool serves a respective one of the plurality of SGW-UP service areas. In this manner, the coordination problem between Tracking Areas (TAs) and the SGW-UP service areas is avoided.

In some embodiments, each virtual SGW-C of the plurality of virtual SGW-Cs is treated, by a Mobility Management Entity (MME), as a legacy SGW.

In some embodiments, the cellular communications system further comprises a MME operable to receive an attach request or TA Update (TAU) request from a User Equipment device (UE) in a TA, obtain an indication of one of the plurality of virtual SGW-Cs that serves the TA, and communicate with the SGW-C to create a session between the UE and the one of the plurality of virtual SGW-Cs that serves the TA.

In some embodiments, a SGW-C for a cellular communications system having an architecture in which SGW-UP functionality is separated from SGW-C functionality comprises a plurality of partitions that form a respective plurality of virtual SGW-Cs. The plurality of virtual SGW-Cs corresponding to a respective plurality of SGW-UP service areas.

In some embodiments, each virtual SGW-C of the plurality of virtual SGW-Cs is treated, by a MME, as a legacy SGW.

In some embodiments, a network node implementing a SGW-C for a cellular communications system having an architecture in which SGW-UP functionality is separated from SGW-C functionality comprises at least one processor and memory comprising instructions executable by the at least one processor whereby the network node is operable to partition the SGW-C into a plurality of virtual SGW-Cs, where the plurality of virtual SGW-Cs correspond to a respective plurality of SGW-UP service areas.

In some embodiments, each virtual SGW-C of the plurality of virtual SGW-Cs is treated, by a MME, as a legacy SGW.

In some embodiments, a cellular communications system having an architecture in which SGW-UP functionality is separated from SGW-C functionality comprises a SGW-C, a plurality of SGW-UP pools each comprising one or more SGW-Us wherein each SGW-UP pool has a respective SGW-UP service area, and a plurality of MME pools each comprising one or more MMEs. Each MME pool of the plurality of MME pools has a respective MME coverage area that is completely within the SGW-UP service area of one of the plurality of SGW-UP pools.

In some embodiments, there is a 1:1 mapping between SGW-UP service areas and MME coverage areas.

In some embodiments, for each SGW-UP pool, SGW-U resources provided by the one or more SGW-Us in the SGW-UP pool can serve all TAs within the SGW-UP service area.

In some embodiments, SGW-U allocation is optimized. Further, in some embodiments, SGW-U allocation is optimized based on location of the one or more SGW-Us with respect to base stations. In some embodiments, upon the SGW-C determining that SGW-U relocation for a UE is beneficial, the SGW-C sends an indication of the SGW-U relocation to an MME allocated to the UE. Further, in some embodiments, the SGW-C sends the indication of the SGW-U relocation to the MME during a Service Request Procedure in a Modify Bearer Response message. In some other embodiments, the SGW-C sends the indication of the SGW-U relocation to the MME duration a TAU with an active flag set. In some embodiments, the indication of the SGW-U relocation comprises an Internet Protocol (IP) address and Tunnel Endpoint Identifications (TEIDs) of a respective SGW-U.

In some embodiments, upon the SGW-C determining that SGW-U relocation for a UE is beneficial, the SGW-C initiates a SGW-U relocation for the UE.

In some embodiments, the SGW-C is informed about what MME pool is used so that the SGW-C can select a SGW-U function within a corresponding service area.

In some embodiments, a method of operation of a MME in a cellular communications system having an architecture in which SGW-UP functionality is separated from SGW-C functionality comprises sending, to a SGW-C, a current location of a UE and receiving, from the SGW-C, a SGW-U identity of a SGW-U allocated to the UE based on the current location of the UE. The method of operation of the MME further comprises receiving a TAU from the UE where the TAU identifies a TA in which the UE is located and determining, based on the SGW-U identity of the SGW-U allocated to the UE, whether the TA identified by the TAU is served by the SGW-U allocated to the UE.

In some embodiments, determining whether the TA identified by the TAU is served by the SGW-U allocated to the UE comprises obtaining a list of TAs served by the SGW-U using the SGW-U identity of the SGW-U and determining whether the TAs identified by the TAU is in the list of TAs served by the SGW-U obtained using the SGW-U identity of the SGW-U allocated to the UE. In some embodiments, the SGW-U identity of the SGW-U is a Fully Qualified Domain Name (FQDN) of the SGW-U, and obtaining the list of TAs served by the SGW-U comprises retrieving the list of TAs served by the SGW-U from a Domain Name System (DNS) using the FQDN of the SGW-U.

In some embodiments, determining whether the TA identified by the TAU is served by the SGW-U allocated to the UE comprises sending a request to a server that asks whether the TA identified in the TAU is served by the SGW-U having the SGW-U identity and receiving a response from the server that comprises an indication of whether the TA identified in the TAU is served by the SGW-U having the SGW-U identity. Further, in some embodiments, the SGW-U identity of the SGW-U is a FQDN of the SGW-U, and sending the request comprises sending a request to a DNS, where the request comprises the FQDN of the SGW-U and an identity of the TA.

In some embodiments, the method further comprises adding the TA to a TA list of the UE if the TA is served by the SGW-U and deleting the TA list of the UE if the TA is not served by the SGW-U such that a new TA list of the UE includes only the TA identified in the TAU.

In some embodiments, the method further comprises, if the TA indicated by the TAU is not served by the SGW-U allocated for the UE, initiating a SGW-U relocation procedure for the UE via the SGW-C.

In some embodiments, the method further comprises, if the TA indicated by the TAU is not served by the SGW-U allocated for the UE, deleting a TA Identity (TAI) list of the UE and starting a new TAI list for the UE and sending an indication to the SGW-C that a new SGW-U needs to be allocated for the UE based on the TA indicated by the TAU.

In some embodiments, a MME is adapted to operate according to any of the embodiments of the method of operation of a MME disclosed herein.

In some embodiments, a MME for a cellular communications system having an architecture in which SGW-UP functionality is separated from SGW-C functionality comprises a sending module, a first receiving module, a second receiving module, and a determining module. The sending module is operable to send, to a SGW-C, a current location of a UE. The first receiving module is operable to receive, from the SGW-C, a SGW-U identity of a SGW-U allocated to the UE based on the current location of the UE. The second receiving module is operable to receive a TAU from the UE, where the TAU identifies a TA in which the UE is located. The determining module is operable to determine, based on the SGW-U identity of the SGW-U allocated to the UE, whether the TA identified by the TAU is served by the SGW-U allocated to the UE.

In some embodiments, a method of operation of a MME for a cellular communications system having an architecture in which SGW-UP functionality is separated from SGW-C functionality comprises receiving, from a SGW-C, an indication that a new SGW-U has been allocated for a UE and, upon receiving the indication, clearing a TAI list of the UE.

In some embodiments, a MME for a cellular communications system having an architecture in which SGW-UP functionality is separated from SGW-C functionality comprises a receiving module operable to receive, from a SGW-C, an indication that a new SGW-U has been selected for a UE and a TAI list clearing module operable to, upon receiving the indication, clear a TAI list of the UE.

In some embodiments, a method of operation of a MME for a cellular communications system having an architecture in which SGW-UP functionality is separated from SGW-C functionality comprises receiving a TAU request from a UE in a TA having a TAI, providing the TAI and a TAI list of the UE to a SGW-C, and receiving, from the SGW-C, an indication of whether a new SGW-U allocated to the UE as a result of a SGW-U relocation procedure performed by the SGW-C serves all TAs in the TAI list of the UE.

In some embodiments, the method further comprises clearing the TAI list of the UE if all of TAs in the TAI list of the UE are not served by the new SGW-U allocated to the UE.

In some embodiments, the method further comprises maintaining the TAI list of the UE if all TAs in the TAI list of the UE are served by the new SGW-U allocated to the UE.

In some embodiments, a MME for a cellular communications system having an architecture in which SGW-UP functionality is separated from SGW-C functionality comprises a first receiving module operable to receive a TAU request from a UE in a TA having a TAI, a providing module operable to provide the TAI and a TAI list of the UE a SGW-C, and a second receiving module operable to receive, from the SGW-C, an indication of whether a new SGW-U allocated to the UE as a result of a SGW-U relocation procedure performed by the SGW-C serves all TAs in the TAI list of the UE.

In some embodiments, a method of operation of a SGW-C in a cellular communications system having an architecture in which SGW-UP functionality is separated from SGW-C functionality comprises receiving a current TAI and a current TAI list of a UE from a MME, selecting a new SGW-U for the UE based on the current TAI of the UE, determining whether the new SGW-U of the UE supports all TAs in the current TAI list of the UE, and providing, to the MME, an indication of whether the new SGW-U of the UE supports all TAs in the current TAI list of the UE.

In some embodiments, selecting the new SGW-U for the UE comprises selecting, if possible, the new SGW-U such that the new SGW-U supports all TAs in the current TAI list of the UE.

In some embodiments, a SGW-C is adapted to operate according to any one of the embodiments of the method of operation of a SGW-C disclosed herein.

In some embodiments, a SGW-C for a cellular communications system having an architecture in which SGW-UP functionality is separated from SGW-C functionality comprises a receiving module operable to receive a current TAI and a current TAI list of a UE from a MME, a selection module operable to select a new SGW-U for the UE based on the current TAI of the UE, a determining module operable to determine whether the new SGW-U of the UE supports all TAs in the current TAI list of the UE, and a providing module operable to provide, to the MME, an indication of whether the new SGW-U of the UE supports all TAs in the current TAI list of the UE.

In some embodiments, a cellular communications system having an architecture in which SGW-UP functionality is separated from SGW-C functionality comprises a SGW-C, a plurality of SGW-UP pools each comprising one or more SGW-Us wherein each SGW-UP pool has a respective SGW-UP service area, and a plurality of MME pools each comprising one or more MMEs. TA handling and SGW-U selection are decoupled such that connectivity between a current TA where a UE is located and a SGW-U allocated for the UE is not guaranteed when the UE operates in IDLE mode.

In some embodiments, during a service request procedure performed in response to a service request from the UE, a SGW-U relocation procedure is performed for the UE such that connectivity between the current TA and the SGW-U allocated for the UE is provided.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
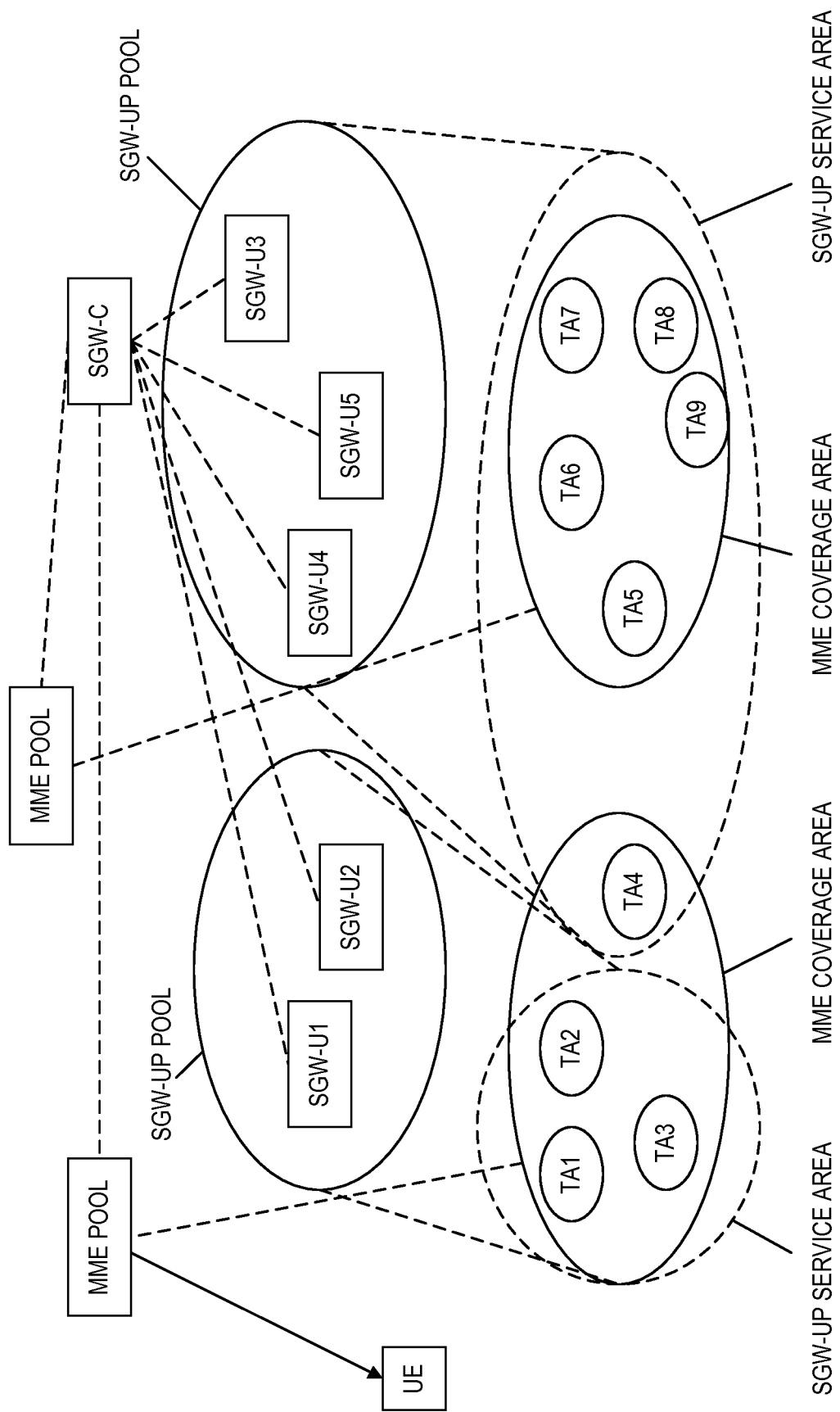
FIG. 1 illustrates uncoordinated Serving Gateway User Plane (SGW-UP) resources.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

While the embodiments described herein are focused on Third Generation Partnership Project (3GPP) Long Term Evolution (LTE), the embodiments described herein may be applicable to other types of cellular communications networks having a separate of control plane and user plane functionality.

Systems and methods for addressing the aforementioned problem are disclosed. In some embodiments, a cellular communications system comprises a Serving Gateway Control plane entity (SGW-C); a plurality of Serving Gateway User Plane (SGW-UP) pools each comprising one or more Serving Gateway User entities (SGW-Us), where each SGW-UP pool has a respective SGW-UP Service Area. The cellular communications system further comprises a plurality of Mobility Management Entity (MME) pools each comprising one or more MME entities, wherein each MME pool has a respective MME coverage area that is completely within the SGW-UP Service Area of one of the plurality of SGW-UP pools.

In some embodiments, there is a 1:1 mapping between SGW Service Areas and MME coverage areas.

In some embodiments, for each SGW-UP pool, SGW-U resources provided by the one or more SGW-Us in the SGW-UP pool can serve all Tracking Areas (TAs) within the SGW-UP Service Area.

In some embodiments, SGW-U allocation is optimized.

In other embodiments, a method of operation of a MME in a cellular communications system, the cellular communications system having an architecture in which SGW-UP functionality is separated from SGW-C functionality, comprises receiving, from a SGW-C, a SGW-U Identity of a SGW-U and obtaining a list of TAs served by the SGW-U using the SGW-U Identity of the SGW-U.

In some embodiments, the SGW-U is a SGW-U selected for a User Equipment device (UE), and the method further comprises receiving a TA Update (TAU) request for the UE, determining whether a TA indicated by the TAU request is served by the SGW-U selected for the UE, and performing a SGW-U relocation procedure for the UE if the TA indicated by the TAU request is not served by the SGW-U selected for the UE. In some embodiments, performing the SGW-U relocation procedure for the UE comprises deleting the TA Identity (TAI) list of the UE and starting a new TAI list for the UE and sending an indication to the SGW-C that a new SGW-U needs to be selected for the UE based on the TA indicated by the TAU request.

In other embodiments, a method of operation of a MME in a cellular communications system, the cellular communications system having an architecture in which SGW-UP functionality is separated from SGW-C functionality, comprises receiving, from a SGW-C, an indication that a new SGW-U has been selected for a UE and, upon receiving the indication, clearing a TAI list of the UE.

In other embodiments, a method of operation of a MME in a cellular communications system, the cellular communications system having an architecture in which SGW-UP functionality is separated from SGW-C functionality, comprises providing a current TAI list of a UE to a SGW-C and receiving an indication of a resulting TAI list for the UE, the resulting TAI list resulting from a SGW-U relocation procedure performed by the SGW-C for the UE.

In other embodiments, a method of operation of a SGW-C in a cellular communications system, the cellular communications system having an architecture in which SGW-UP functionality is separated from SGW-C functionality, comprises receiving a current TAI list of a UE from a MME, selecting a new SGW-U for the UE, determining whether the new SGW-U of the UE supports all TAs in the current TAI list of the UE, and, based on the determining, providing a resulting TAI list for the UE to the MME.

In other embodiments, a cellular communications system comprises a SGW-C partitioned into a plurality of virtual SGW-Cs that correspond to a respective plurality of SGW-UP Service Areas and a plurality of SGW-UP pools each comprising one or more SGW-Us, wherein each SGW-UP pool serves a respective one of the plurality of SGW-UP Service Areas.

Figure 2:
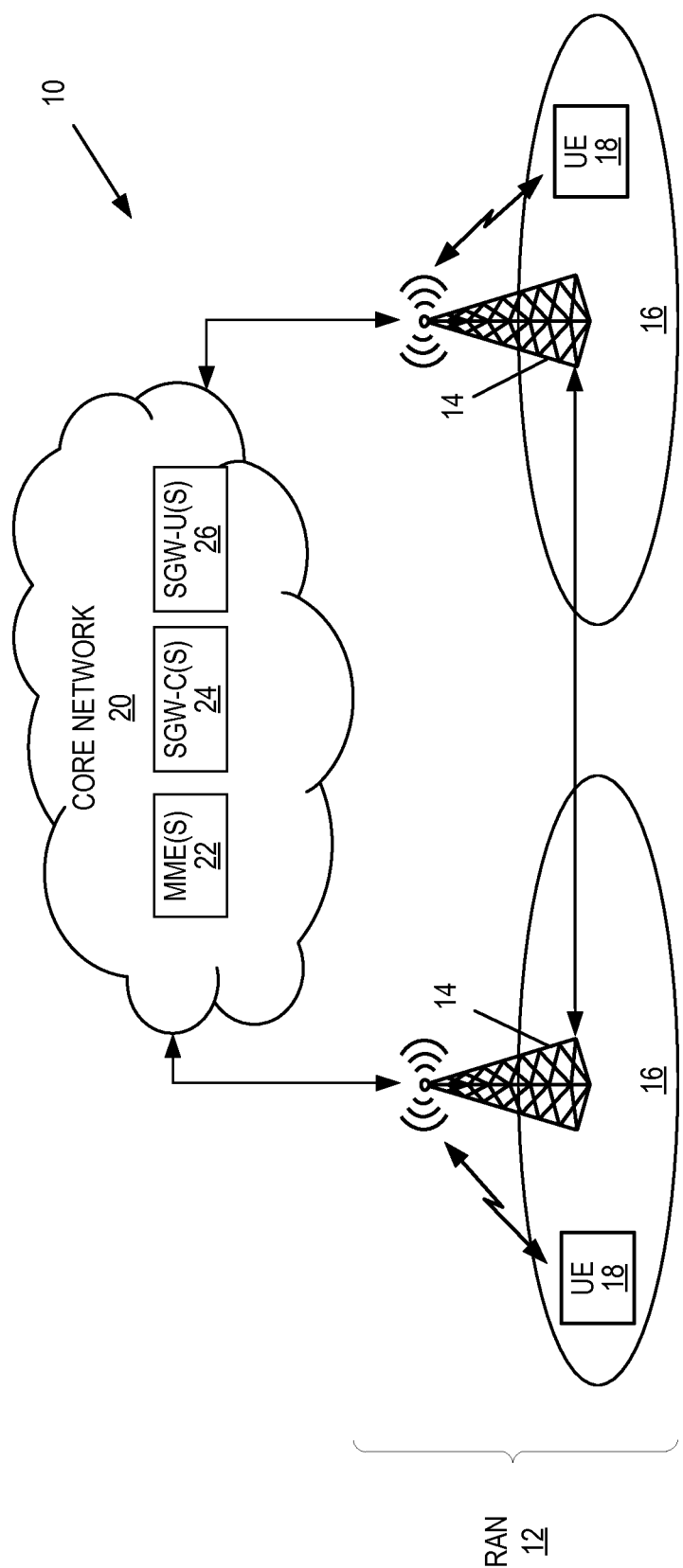
FIG. 2 illustrates one example of a cellular communications network in which embodiments of the present disclosure can be implemented.

FIG. 2 illustrates one example of a cellular communications system 10 in which embodiments of the present disclosure may be implemented. As illustrated, the cellular communications system 10 includes a Radio Access Network (RAN) 12 that includes a number of radio access nodes 14 (e.g., base stations such as, e.g., enhanced or evolved Node Bs (eNBs)) having corresponding cells 16. The radio access nodes 14 provide wireless, or radio, access to UEs 18 located within the cells 16.

The radio access nodes 14 are connected to a core network 20. The core network 20 includes one or more MMEs 22, one or more SGW-Cs 24, and one or more SGW-Us 26, each of which can be implemented as or on a network node (i.e., as a combination of hardware and/or software forming a network node or as software executed by a network node). Notably, as described herein, the SGW-UP functionality is separated from SGW-C functionality. The SGW-UP functionality is provided by the SGW-Us 26, and the SGW-C functionality is provided by the SGW-Cs 24. As described above, the separation of the SGW-UP functionality from the SGW-C functionality, while providing many benefits, does give rise to a coordination problem between TAs and the SGW-UP Service Areas.

There can be a number of solutions to the coordination problem between the TAs and the SGW-UP Service Areas. A number of these solutions are described below.

Solution 1

A first solution, which is referred to herein as Solution 1, is based on configuration of service areas. Solution 1 can be described as follows:

Condition 1. One or multiple complete MME pool area(s) (also referred to herein as MME coverage areas or MME pool coverage areas) shall be completely within a SGW-U serving area (also referred to herein as a SGW-UP serving area). For example, the MME pool areas and SGW-U serving areas may map 1:1.

Condition 2. The SGW-U resources shall be in a pool within the SGW-U serving area where all User Plane (UP) resources (i.e., all SGW-U resources within the SGW-UP pool) can serve all TAs within the SGW-U serving area (and therefore also within the MME pool area).

Assumption 3 (optional). Some SGW-U resources may be better than others to serve certain TAs, and it shall therefore be possible to optimize the SGW-U selection.

Based on Conditions 1 and 2, the TAI List problem disappears. Since all TAs within the MME pool area can be served by the current SGW-U, the TA can be added to the TAI List and no SGW-U relocation is needed. There may be a need to inform the SGW-C about what MME pool is used so that the SGW-C can select a SGW-U function within the corresponding Service Area. In other words, if there are multiple MME pools connected to the same SGW-C, the MME pools may be served by separate SGW-UP Service Areas. For instance, in the example of FIG. 3 which is described in detail below, the SGW-C 24 needs to know if it is contacted by the left or the right MME pool in order to select a SGW-U from SGW-UP service area 30-1 or SGW-UP service area 30-2.

Based on Assumption 3, there may be optimizations to be done in SGW-U allocation. Solution 1 works without Assumption 3; however, Assumption 3 is a way of "softening" Conditions 1 and 2 by offering the possibility to select SGW-Us that are, e.g., closer to some eNBs. At the same time, since "full mesh" is supported, an immediate change of SGW-U is not required. As used herein, "full mesh" means that there is connectivity from all TAs in the MME pool service area between all SGW-Us supporting that service area and the eNBs supporting the TAs. In other words, "full mesh" means that there is total connectivity, i.e., any eNB within any TA within the MME coverage area is or can be connected to any SGW-U in the SGW-UP pool. Different solutions are possible to accomplish the optimization:

Alternative A: The Service Request procedure may be changed such that, if the SGW-C determines that SGW-U relocation is beneficial, the new SGW-U Internet Protocol (IP) address and Tunnel Endpoint Identifications (TEIDs) can be sent to the eNB when the UE goes from IDLE to CONNECTED state. The SGW-C sends an indication (or SGW-U IP address and TEIDs) to the MME in the Modify Bearer Response message, and the MME can update the eNB immediately or use the new parameters the next time the UE makes a Service Request. One example of Alternative A is described below with respect to FIG. 4; or Alternative B: Alternative B is a solution based on the new SGW-C initiated procedure as documented in 3GPP Technical Report (TR) 23.714, clause 6.3.1, where the SGW-C can initiate an SGW-U relocation at any time. One example of Alternative B is described below with respect to FIG. 5.

Figure 3:
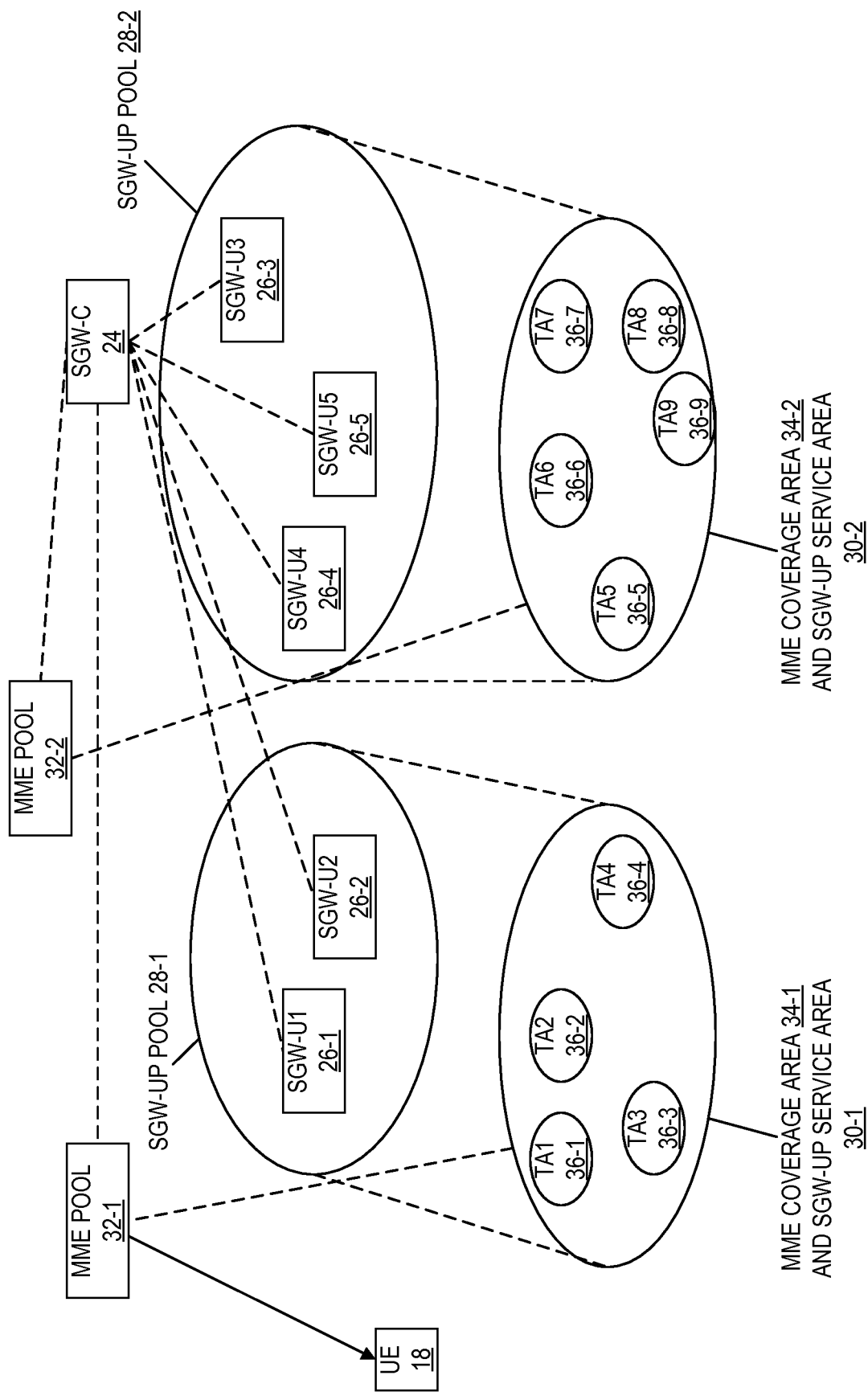
FIG. 3 illustrates configuration of SGW-UP service areas showing an example with 1:1 mapping between Mobility Management Entity (MME) pool areas and Serving Gateway (SGW) service areas according to one embodiment of the present disclosure.

FIG. 3 illustrates one example of Solution 1. As illustrated, the cellular communications system 10 and, in particular the core network 20, includes a number of SGW-UP pools 28-1 and 28-2 (generally referred to herein collectively as SGW-UP pools 28 and individually as SGW-UP pool 28) each including a number of SGW-Us 26. The SGW-Us 26 in the SGW-UP pool 28-1 are, in this example, SGW-U 26-1 and SGW-U 26-2, which are also referred to herein as SGW-U1 and SGW-U2, respectively. The SGW-Us 26 in the SGW-UP pool 28-2 are, in this example, SGW-Us 26-3, 26-4, and 26-5, which are also referred to herein as SGW-U3, SGW-U4, and SGW-U5, respectively.

The SGW-UP pool 28-1 has a SGW-UP service area 30-1 that includes a number of TAs 36-1 through 36-4 (also referred to herein as TA1 through TA4), and the SGW-UP pool 28-2 has a SGW-UP service area 30-2 that includes a number of TAs 36-5 through 36-9 (also referred to herein as TA5 through TA9). The SGW-UP service areas 30-1 and 30-2 are generally referred to herein collectively as SGW-UP service areas 30 and individually as SGW-UP service area 30. The TAs 36-1 through 36-9 are generally referred to herein collectively as TAs 36 and individually as TA 36. The cellular communications system 10 and, in particular the core network 20, also includes a SGW-C 24 that provides the SGW control plane functionality for the SGW-UP pools 28.

The cellular communications system 10 and, in particular the core network 20, also includes MME pools 32-1 and 32-2, which are generally referred to herein collectively as MME pools 32 and individually as MME pool 32. Each MME pool 32 includes a number of MMEs 22 (not shown). The MME pool 32-1 has a MME coverage area 34-1 that includes TAs 36-1 through 36-4, and the MME pool 32-2 has a MME coverage area 34-2 that includes TAs 36-5 through 36-9. The MME coverage areas 34-1 and 34-2 are generally referred to herein collectively as MME coverage areas 34 and individually as MME coverage area 34.

In this example of Solution 1, there is a 1:1 mapping between the SGW-UP service areas 30 and the MME coverage areas 34. In other words, the SGW-UP service area 30-1 includes the same TAs 36 as the MME coverage area 34-1, and the SGW-UP service area 30-2 includes the same TAs 36 as the MME coverage area 34-2. This satisfies Condition 1 above. Also, all SGW-U resources within the same SGW-UP pool 28 can serve all TAs 36 within the SGW-UP service area 30 and, therefore, also within the respective MME coverage area 34. This satisfies Condition 2 above.

In addition, optionally, the cellular communications system 10 of FIG. 3 may optimize SGW-U allocation based on Assumption 3, as described above. For example, when allocating a SGW-U 26 to the UE 18 based on the current TA, or current TAI, of the UE 18, the SGW-U 26 allocated to the UE 18 may be optimized based on, e.g., distance from a particular radio access node(s) 14.

Figure 4:
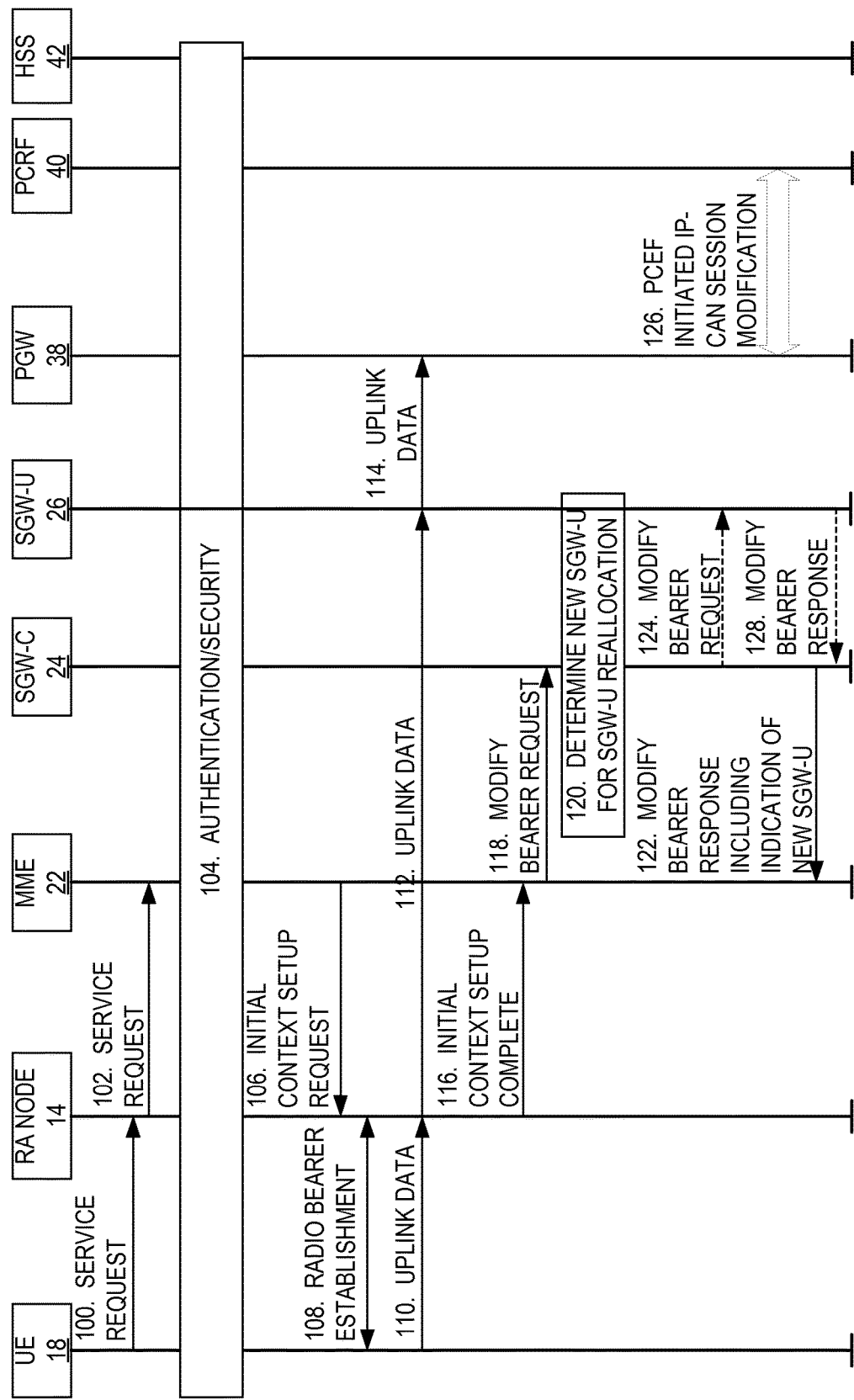
FIG. 4 illustrates a service request procedure in which an indication of a new SGW user plane entity (SGW-U) is indicated in the Modify Bearer Response according to some embodiments of the present disclosure.

FIG. 4 illustrates one example of a process for accomplishing the optimization of the SGW-U allocation according to Alternative A described above. In particular, FIG. 4 illustrates one example of a Service Request Procedure where, if the SGW-C 24 determines that SGW-U relocation is beneficial, an indication of the new SGW-U 24 allocated for the UE 18 (e.g., the new SGW-U IP address and TEIDs) is provided to the MME 22 in the Modify Bearer Response message. As described above, the MME 22 can update the radio access node 14 (e.g., eNB) immediately or use the new parameters the next time the UE 18 makes a Service Request.

More specifically, as illustrated, the UE 18 sends a Service Request to the MME 22 via the radio access node 14 (steps 100 and 102). In some embodiments, the Service Request is encapsulated in a Radio Resource Control (RRC) message to the radio access node 14. Optionally, the MME 22 may trigger authentication and security procedures (step 104). The MME 22 sends an Initial Context Setup Request to the radio access node 14 (step 106), and the radio access node 14 and the UE 18 perform radio bearer establishment (step 108). The UE 18 may then transmit uplink data to the radio access node 14, where the radio access node 14 forwards the uplink data to the SGW-U 26 allocated for the UE 18 and the SGW-U 26 forwards the uplink data to a Packet Data Network (PDN) Gateway (PGW) 38 (steps 110 through 114).

In addition, the radio access node 14 sends an Initial Context Setup Complete message to the MME 22 (step 116). The MME 22 then sends a Modify Bearer Request to the SGW-C 24 (step 118). If SGW-U relocation is needed or desired, the SGW-C 24 determines a new SGW-U 26 for the UE 18 (step 120) and sends an indication of the new SGW-U 26 to the MME 22 in a Modify Bearer Response (step 122). The Service Request procedure may optionally include other steps such as, e.g., sending of a Modify Bearer Request from the SGW-C 24 to the PGW 38 (step 124), performing a Policy Control Enforcement Function (PCEF) initiated IP Connectivity Access Network (IP-CAN) session modification with a Policy and Charging Rules Function (PCRF) 40 (step 126), and sending a Modify Bearer Response from the PGW 38 to the SGW-C 24 (step 128). Notably, the details of Service Request Procedure of FIG. 4 other than step 120 and the inclusion of the indication of the new SGW-U in the Modify Bearer Response in step 122 are known to one of skill in the art and, as such, are not repeated herein.

Figure 5:
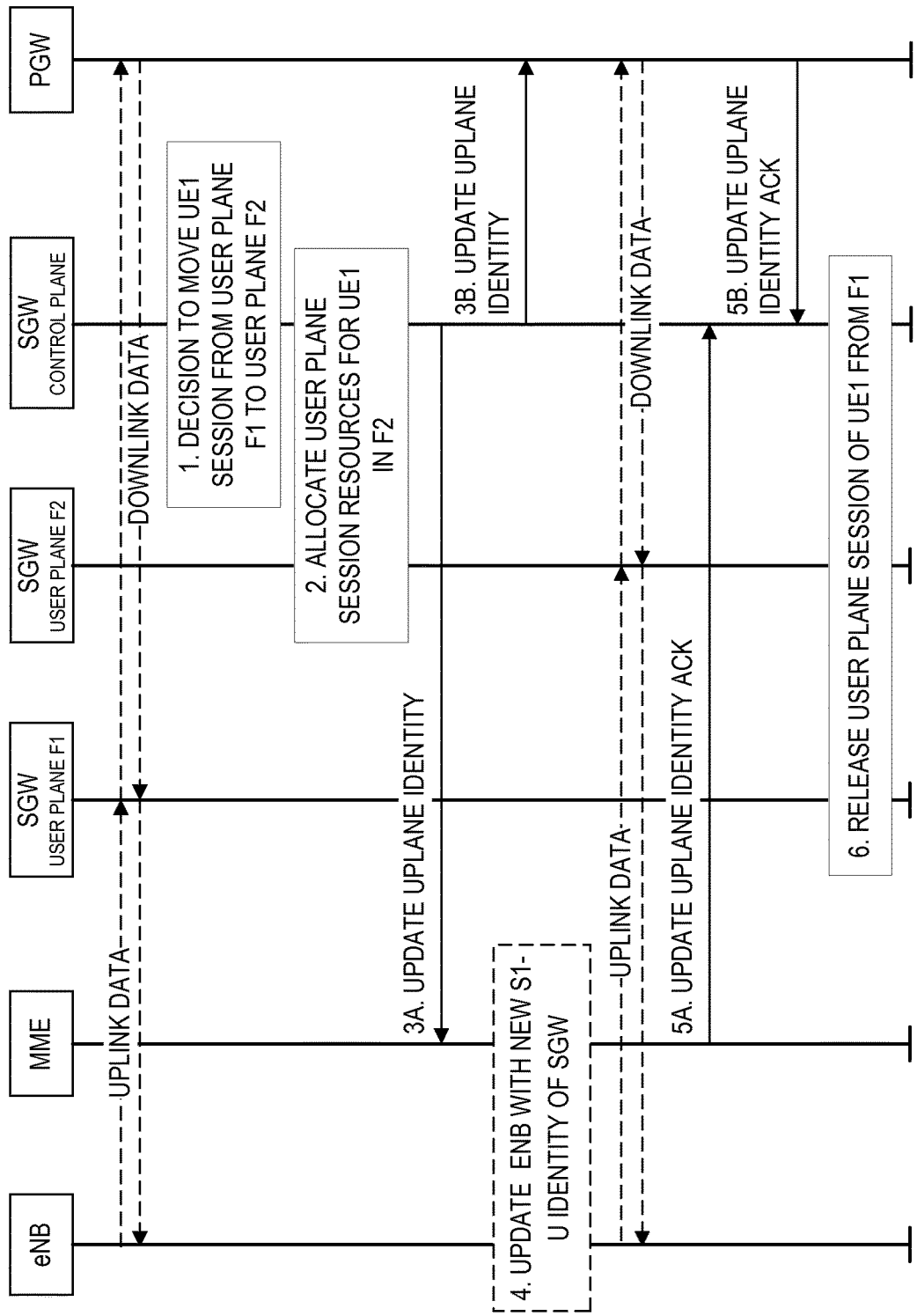
FIG. 5 illustrates a SGW control plane entity (SGW-C) initiated procedure for SGW-U relocation according to some embodiments of the present disclosure.

FIG. 5 illustrates one example of a process for accomplishing the optimization of the SGW-U allocation according to Alternative B described above. Notably, FIG. 5 is reproduced from 3GPP TR 23.714 version 0.2.0, Clause 6.3.1. As such, the details of this process are known to those of skill in the art and are not repeated herein. However, the important thing to note is that this process may be utilized to enable SGW-U relocation for SGW-U optimization according to Assumption 3 described above.

Solution 2

A second solution, which is referred to herein as Solution 2, is based on signaling between the MME 22 and the SGW-C 24. An assumption for Solution 2 is as follows. When moving IDLE→ACTIVE, it is assumed that the existing SGW TEIDs can be used, i.e. there is no need to modify the Service Request procedure to allow reallocation of the SGW-U (i.e., modification of SGW TEID).

Figure 6:
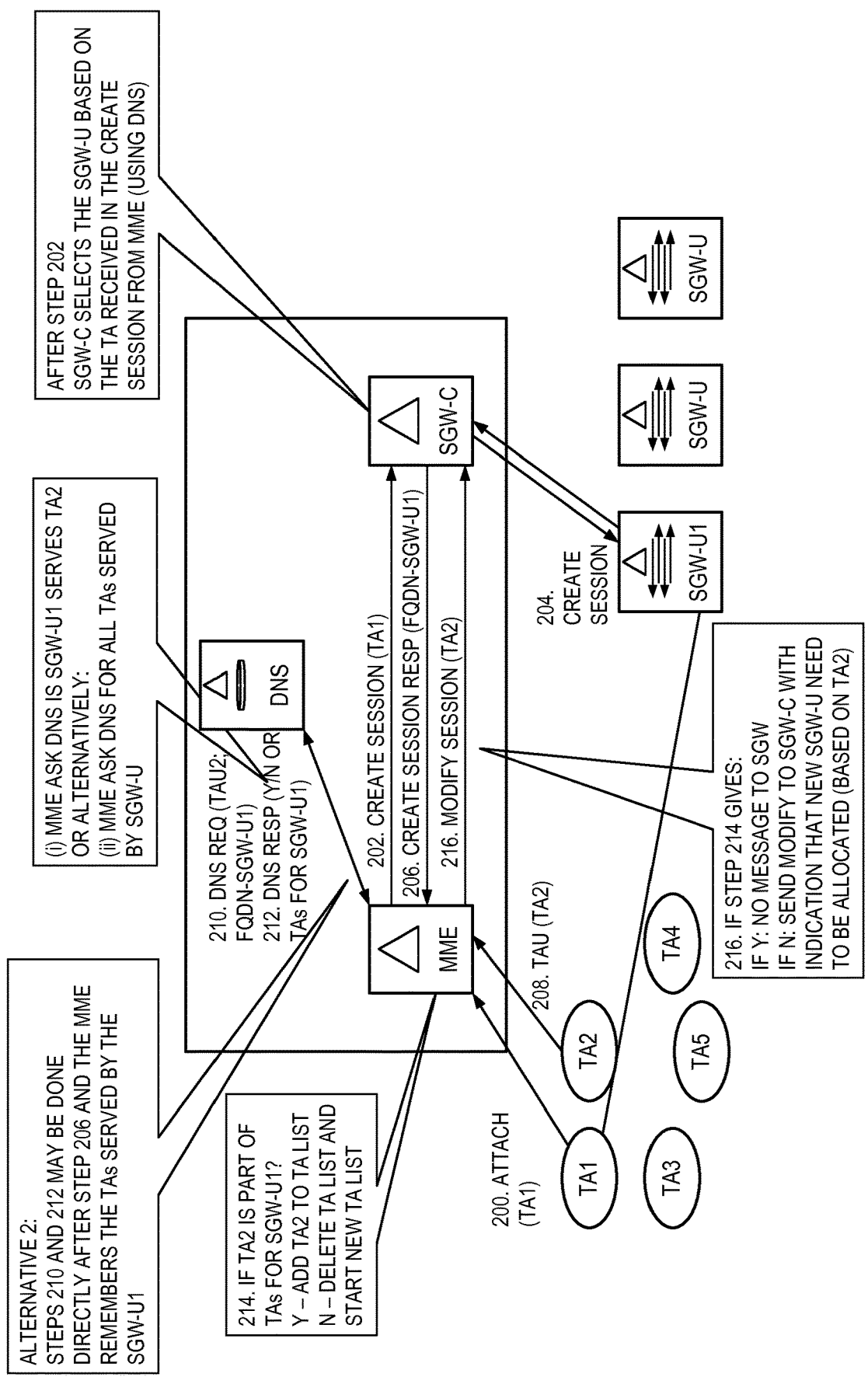
FIG. 6 illustrates a procedure in which an MME learns what SGW-U is selected for a User Equipment device (UE) according to one embodiment of the present disclosure.

A first embodiment of Solution 2, which is referred to herein as Solution 2A, is the MME 22 learning what SGW-U 26 is selected. FIG. 6 illustrates one example of Solution 2A. In general, Solution 2A includes the following:

The SGW-C 24 sends the SGW-U Identity (e.g., Fully Qualified Domain Name (FQDN)) to the MME 22 (step 206). The MME 22 can then retrieve (e.g., via Domain Name System (DNS)) the list of TAs served by that SGW-U function (steps 210 and 212). In this way, the MME 22 gets to know the SGW-U Service Area and can populate the TAI List as today.

The MME 22 can also initiate SGW-U relocation via the SGW-C 24 if needed. For example, as illustrated in FIG. 6, upon receiving a TAU request for the UE 18 for, in this example, TA2, the MME 22 determines whether TA2 is served by the currently selected SGW-U 26 (which is SGW-U1) for the UE 18 (step 214). If so, TA2 is added to the TAI list of the UE 18. If not, the MME 22 deletes or clears the TAI list of the UE 18, starts a new TAI list for the UE 18, and sends an indication to the SGW-C 24 that a new SGW-U 26 needs to be allocated, or selected, for the UE 18 based on TA2 (step 216). This indication may be provided in, e.g., a Modify Session message. Upon receiving the indication, the SGW-C 24 selects a new SGW-U 26 for the UE 18 and the procedure returns to step 206 where the SGW-C 24 sends the SGW-U Identity of the newly selected SGW-U 26 for the UE 18 to the MME 22.

More specifically, as illustrated in FIG. 6, in this example, a UE 18 (not shown) in TA1 sends an attach request including the TAI of TA1 to the MME 22 (step 200). The MME 22 sends a create session request to the SGW-C 24, where the create session request includes the TAI of TA1 (step 202). The SGW-C 24 selects the SGW-U 26 for the UE 18 based on the TAI received from the MME 22 in the create session message. This selection may be performed using, e.g., a DNS. For example, there is currently in the 3GPP standard a DNS query from the MME 22 that, based on TAI, makes a selection of SGW. A similar DNS query can be used by the SGW-C 24 to select the SGW-U 26. As another example, in some embodiments, there is a table in the SGW-C 24 of SGW-Us 26 that serves the different TAs, possibly with additional information. This table may alternatively be included in a DNS. The SGW-C 24 then communicates with the selected SGW-U 26, which in this example is SGW-U1, to create a session for the UE 18 (step 204).

The SGW-C 24 sends the SGW-U Identity (e.g., FQDN) of the selected SGW-U 26 to the MME 22 in a create session response (step 206). The MME 22 can also initiate SGW-U relocation via the SGW-C 24 if needed. For example, as illustrated in FIG. 6, upon receiving a TAU request for the UE 18 for, in this example, TA2 (step 208), the MME 22 determines whether TA2 is served by the currently selected SGW-U 26 for the UE 18, which in this example is SGW-U1. More specifically, in one embodiment, after receiving the TAU request for the UE 18, the MME 22 retrieves (e.g., via DNS) a list of TAs served by the currently selected SGW-U 26 (steps 210 and 212). Alternatively, the MME 22 may perform steps 210 and 212 directly after step 206, where the MME 22 remembers or stores the TAs served by the currently selected SGW-U 26 of the UE 18. In this way, the MME 22 gets to know the SGW-U Service Area and can populate the TAI List, e.g., in the conventional manner. As yet another alternative, in steps 210 and 212 after receiving the TAU request, the MME 22 determines whether the TAI included in the TAU request is served by the currently selected SGW-U 26 of the UE 18 by, e.g., querying the DNS to ask with the currently selected SGW-U 26 of the UE 18 serves the TA indicated in the TAU request, which in this example is TA2. The DNS responds with an indication of whether the currently selected SGW-U 26 serves TA2.

Based on the knowledge obtained in steps 210 and 212, the MME 22 determines whether TA2 is served by the currently selected SGW-U 26. If so, the MME 22 adds the TAI of TA2 to the TAI list of the UE 18; if not, the MME 22 deletes or clears the TAI list of the UE 18 and starts a new TAI list for the UE 18 including only the TAI of TA2 (step 214). Also, if TA2 is not served by the currently selected SGW-U 26, the MME 22 sends an indication to the SGW-C 24 that a new SGW-U 26 needs to be allocated, or selected, for the UE 18 based on the TAI of TA2 (step 216). This indication may be provided in, e.g., a Modify Session message. Upon receiving the indication, the SGW-C 24 selects a new SGW-U 26 for the UE 18 and the procedure returns to step 206 where the SGW-C 24 sends the SGW-U Identity of the newly selected SGW-U 26 for the UE 18 to the MME 22.

A second embodiment of Solution 2, which is referred to herein as Solution 2B, is the SGW-C 24 learning the TA and influencing the TAI-List. Solution 2B includes the following:

The MME 22 sends the current UE location (TA) to the SGW-C 24 during the TAU procedure. This allows the SGW-C 24 to assess (e.g., with help of DNS) if the current TA is served by the current SGW-U 26 and can initiate a SGW-U relocation if needed. A procedure for SGW-U relocation is already captured in 3GPP TR 23.714 clause 6.3.1. One issue however is that the new SGW-U 26 may or may not support the TAs in the old TAI List sent to the UE 18. To address this, the MME 22 would need to clear the TAI List of a UE 18 every time a new SGW-U 26 is selected for the UE 18 (referred to herein as Solution 2B(1)), or the MME 22 needs to provide the current TAI List of the UE 18 to the SGW-C 24 so that the SGW-C 24 can determine if the new SGW-U 26 supports all TAs in the list and indicate the resulting TAI List back to the MME 22 (referred to herein as Solution 2B(2)). When the SGW-U 26 does not support all the TAs in the TA list, the TAI List is cleared and a new one is started, which first consists of only one TA, i.e. the current TA where the UE 18 is currently located. When the UE 18 moves from TA to TA, sending a TAU message each time it gets into a new TA (which is not in the TAI List), the new TAI is added to the list and the TAI List grows as long as the SGW-U 26 supports all the TAs in the list.

Figure 7A:
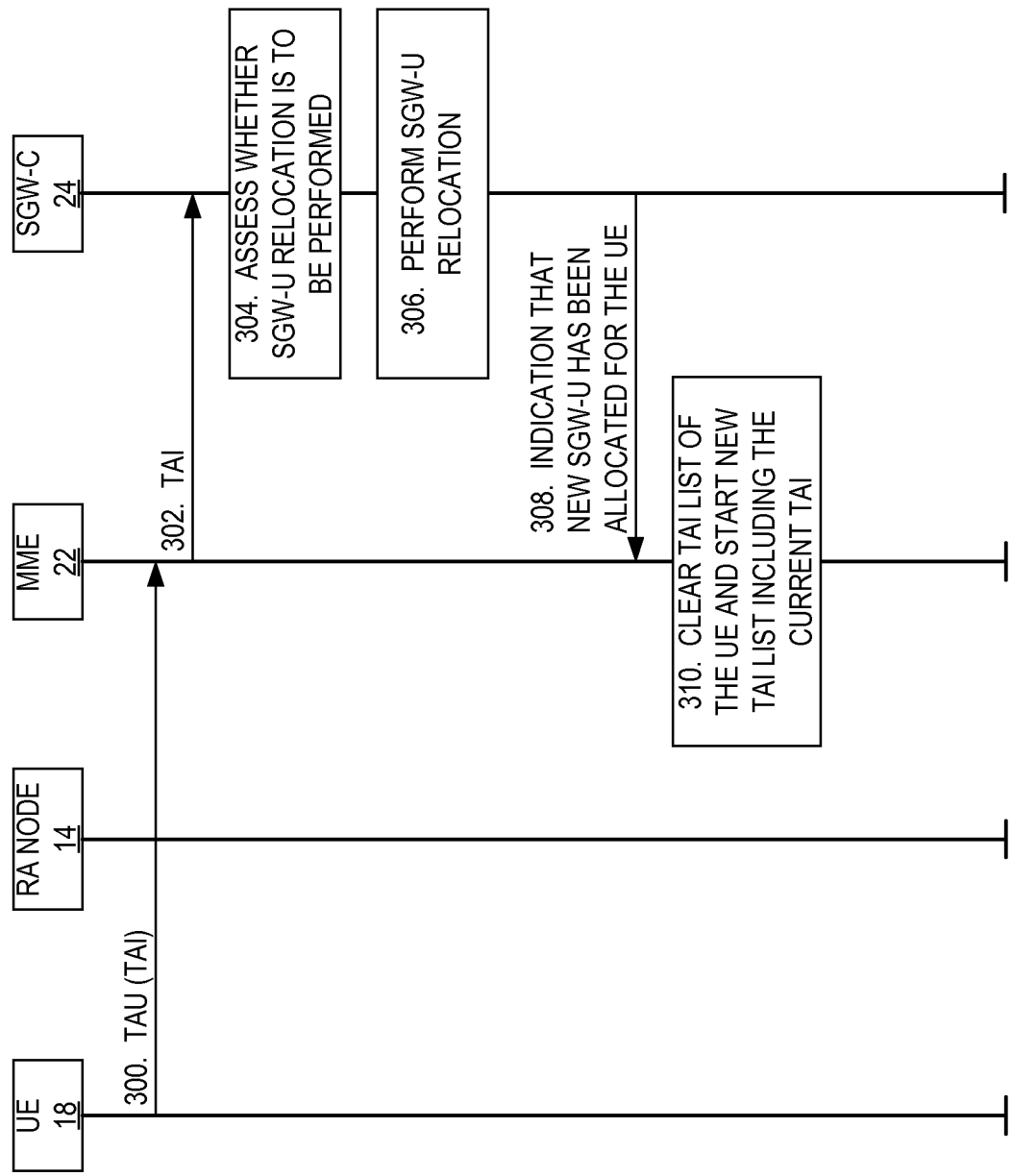
FIGS. 7A and 7B illustrate two example embodiments of a procedure for maintaining a Tracking Area (TA) List for a UE upon SGW-U relocation according to some embodiments of the present disclosure.

FIG. 7A illustrates one example of Solution 2B(1) according to some embodiments of the present disclosure. As illustrated, the MME 22 receives a TAU request for the UE 18 where the TAU request includes a TAI of the TA in which the UE 18 is currently located (step 300). The MME 22 sends the TAI to the SGW-C 24, e.g., in a modify session request (step 302). The SGW-C 24 assesses whether SGW-U relocation is to be performed (step 304). In other words, the SGW-C 24 determines whether the TA identified by the TAI received from the MME 22 is served by the current SGW-U 26 allocated for the UE 18. This determination may be made by obtaining a list of TAIs served by the current SGW-U 26 allocated for the UE 18. This list may be obtained from, e.g., a DNS that stores such a list for some or all SGW-Us 26. In this example, the SGW-C 24 determines that SGW-U relocation is to be performed and, as such, performs SGW-U relocation to thereby select a new SGW-U 26 for the UE 18 (step 306). The new SGW-U 26 is a SGW-U 26 that serves the TA identified by the TAI received from the MME 22 in step 302. The SGW-C 24 sends an indication to the MME 22 that a new SGW-U 26 has been allocated or selected for the UE 18 (step 308). This indication may include information that identifies the new SGW-U 26 such as, e.g., the SGW-U IP address and TEID(s) of the new SGW-U 26, as described above. Upon receiving the indication, the MME 22 clears the TAI List of the UE 18 and starts a new TAI for the UE 18 that includes the TAI of the TA in which the UE 18 is currently located (i.e., the TAI received in the TAU request of step 300) (step 310).

Figure 7B:
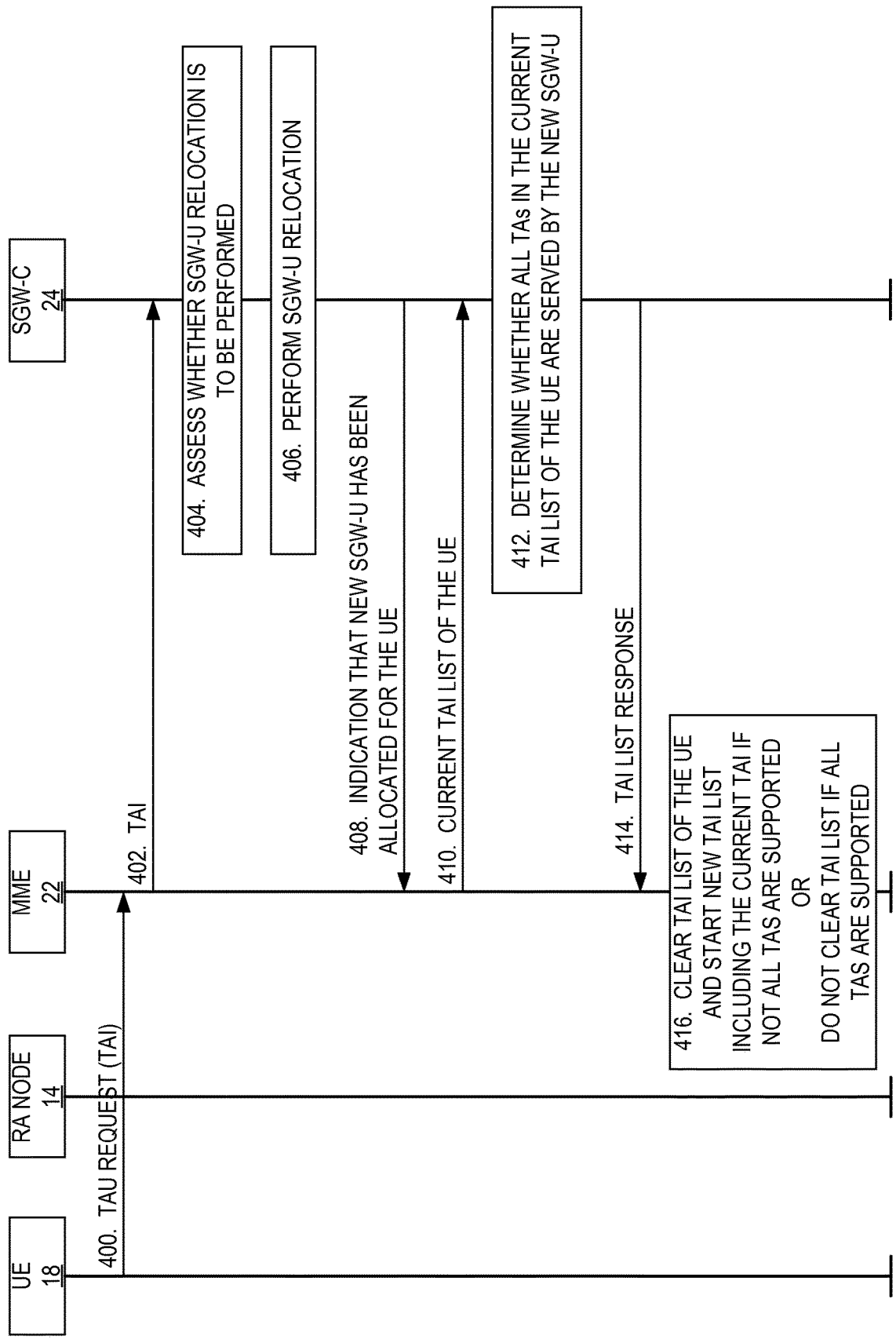

FIG. 7B illustrates one example of Solution 2B(2) according to some embodiments of the present disclosure. As illustrated, the MME 22 receives a TAU request from the UE 18 where the TAU request includes a TAI of the TA in which the UE 18 is currently located (step 400). The MME 22 sends the TAI to the SGW-C 24, e.g., in a modify session request (step 402). The SGW-C 24 assesses whether SGW-U relocation is to be performed (step 404). In other words, the SGW-C 24 determines whether the TA identified by the TAI received from the MME 22 is served by the current SGW-U 26 allocated for the UE 18. This determination may be made by obtaining a list of TAIs served by the current SGW-U 26 allocated for the UE 18. This list may be obtained from, e.g., a DNS that stores such a list for some or all SGW-Us 26. In this example, the SGW-C 24 determines that SGW-U relocation is to be performed and, as such, performs SGW-U relocation to thereby select a new SGW-U 26 for the UE 18 (step 406). The new SGW-U 26 is a SGW-U 26 that serves the TA identified by the TAI received from the MME 22 in step 402. Further, in some embodiments, if possible, the SGW-C 24 selects the new SGW-U 26 such that the new SGW-U 26 also serves all other TAs in the current TA list of the UE 18.

The SGW-C 24 sends an indication to the MME 22 that a new SGW-U 26 has been allocated or selected for the UE 18 (step 408). This indication may include information that identifies the new SGW-U 26 such as, e.g., the SGW-U IP address and TEID(s) of the new SGW-U 26, as described above. Upon receiving the indication, in this example, the MME 22 sends the current TAI List of the UE 18 to the SGW-C 24 (step 410). Alternatively, step 410 may be provided together with step 402 prior to steps 404 and/or 406. The SGW-C 24 determines whether the new SGW-U 26 selected or allocated for the UE 18 serves all TAs in the current TAI List of the UE 18 (step 412) and sends a corresponding TAI list response to the MME 22 (step 414). In some embodiments, the TAI list response is an indication of whether all TAs in the current TAI List of the UE 18 are served by the new SGW-U 26. If the TAI list response indicates that not all of the TAs in the current TAI List of the UE 18 are served by the new SGW-U 26, the MME 22 clears the TAI List of the UE 18 and starts a new TAI List for the UE 18 that only includes the TAI of the TA in which the UE 18 is currently located (step 416). However, if the TAI List response indicates that all of the TAs in the current TAI List of the UE 18 are served by the new SGW-U 26, then the MME 22 does not clear the TAI List of the UE 18 and adds the TAI of the TA in which the UE 18 is currently located to the TAI List (step 416).

Solution 3

Figure 8:
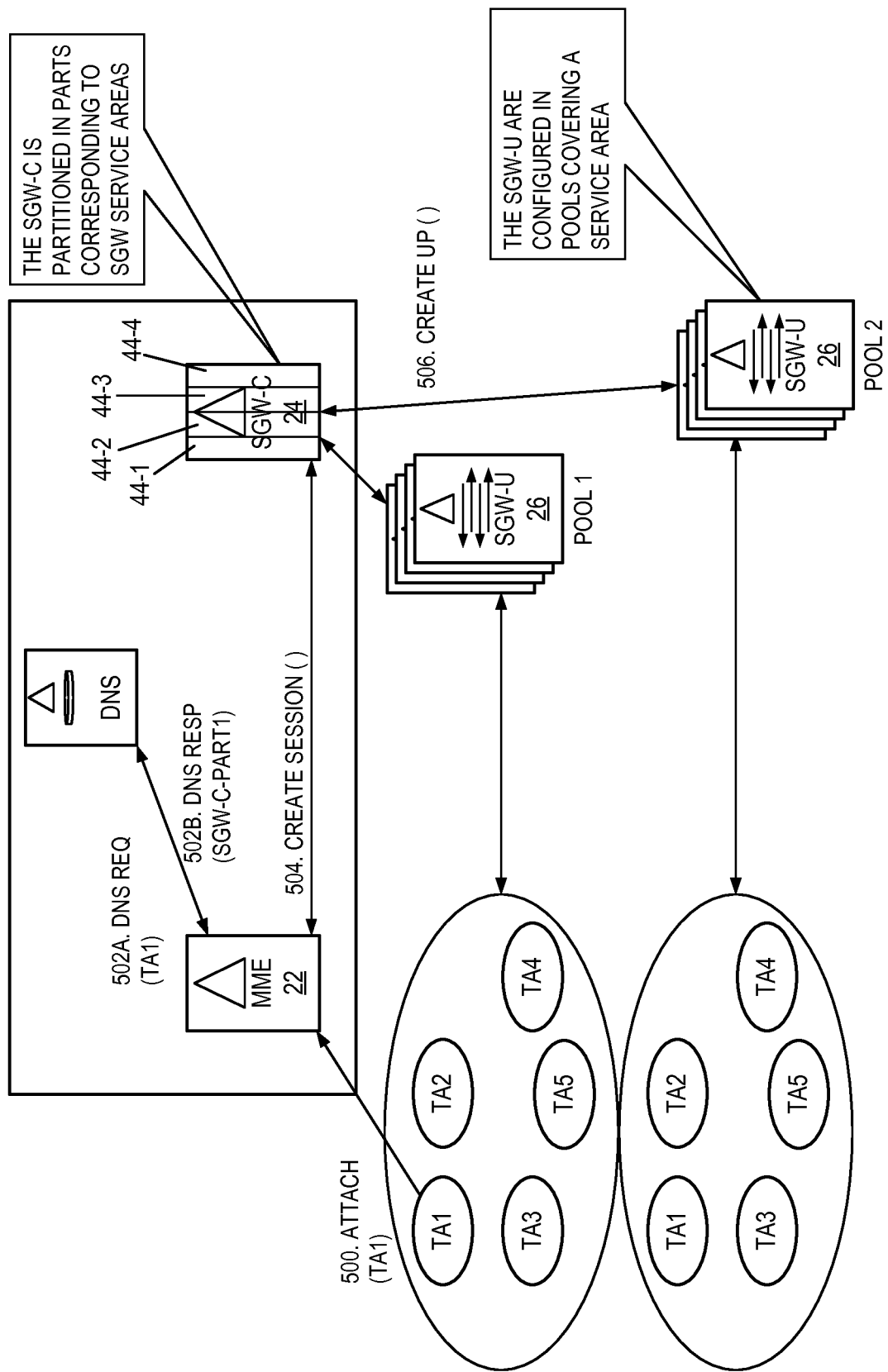
FIG. 8 illustrates a partitioned SGW-C with no MME impact according to one embodiment of the present disclosure.

In a third solution, which is referred to herein as Solution 3, the SGW-C 24 is partitioned (no MME 22 impact). One example of this partitioning is illustrated in FIG. 8. Solution 3 includes the following:
  The SGW-C 24 is partitioned in "virtual" SGW-Cs that
    correspond to SGW-UP service areas similar to a
    legacy SGW. The SGW-U resources are deployed in
    "pools" within these partitions. With this configuration,
    the MME 22 treats the different SGW-C partitions in
    the same way as SGWs are handled in the current
    Evolved Packet Core (EPC) architecture.
  Note, the same optimizations as for Solution 1 can also be
    done for Solution 3, as long as they are done within one
    "virtual SGW_C" partition.

As illustrated in FIG. 8, the SGW-C 24 is partitioned into multiple virtual SGW-Cs 44-1 through 44-4. Note that while there are four virtual SGW-Cs 44 in this example, there may be any number of two or more virtual SGW-Cs 44. Each virtual SGW-C 44 corresponds to a respective SGW-U service area, which is served by a SGW-UP pool that includes a number of SGW-Us 26 (i.e., one or more SGW-Us 26 but preferably multiple SGW-Us 26). The MME 22 treats each virtual SGW-C 44 (i.e., each SGW-C partition) as a separate (e.g., legacy or conventional) SGW.

As one example of the operation, as illustrated in FIG. 8, the MME 22 receives an attach request or alternatively a TAU request for a TA for a UE 18 (step 500). In this example, the TA is TA1. The MME 22 determines the virtual SGW-C partition 44 allocated to the UE 18 (step 502) by, in this example, querying an DNS with the TAI of TA1 (step 502A) and, in response, receiving an indication of virtual SGW-C 44-1 (step 502B). The MME 22 then communicates with the virtual SGW-C 44-1 to create a session for the UE 18 (step 504). The virtual SGW-C 44-1 creates a session for the UE 18 with one of the SGW-Us 26 in the respective SGW-U pool (step 506).

Solution 4

A fourth solution, which is referred to herein as Solution 4, is decoupling TA handling and SGW-UP selection. In this solution, the TA handling and SGW-UP selection are decoupled, in the sense that the MME 22 manages TA (and TAI List) handling, while the SGW-C 24 handles SGW-U 26 selection. The MME 22 can thus disregard SGW-U Serving Areas completely, or in practice assume that the whole MME serving area is supported by the selected SGW-U 26, similar to Solution 1. However, in difference to Solution 1, there is no requirement on configuring SGW Service Areas. Instead, it is assumed that the SGW-C 24 ensures that an SGW-U 26 is selected that has appropriate connectivity to the serving eNB (i.e., the serving radio access node 14). This solution requires that the Service Request procedure is modified so that SGW TEIDs can be changed during the Service Request procedure, basically introducing another round trip on S11 in addition to the existing procedure. On the other hand, during TAU, there is no need to signal SGW from the MME 22 as long as the UE 18 stays in the same MME 22.

The UE 18 can be in either of two states, IDLE or CONNECTED. In IDLE, there is no radio connection, and the UE 18 is not connected to any eNB. In IDLE state, the UE 18 sends TAU messages to the MME 22, and the UE 18 is only known by the TA; whereas, in CONNECTED, the UE 18 is connected to a specific eNB and known by the MME 22 by the eNB (i.e., by the cell). To send and receive data, the UE 18 needs to go from IDLE to CONNECTED state. The UE 18 sends a Service Request message, which causes the connectivity from the SGW to the eNB to the UE 18 to be set up. In the conventional system, during the IDLE state, the system ensures that the SGW is selected such that when the UE 18 wants to go into CONNECTED and starts sending and receiving data, the connectivity can be provided by the current SGW, i.e. the SGW serves the current TA. There is no need to change the SGW in the Service Request procedure. Therefore, it is said that the MME 22 ensures a coupling between the TA and the SGW is maintained during IDLE state.

Then, what is referred to herein as decoupling of TA and SGW-U 26 is that the MME 22 does not guarantee the TA-to-SGW-U coupling during IDLE. The MME 22 just keeps track of the UE 18 and remembers in which TA the UE 18 is located, but the MME 22 does not care about which SGW-U 26 serves this TA. This means that when the UE 18 wants to start sending data and goes to CONNECTED state, i.e. the UE 18 sends the Service Request message, the MME 22 is not at all certain that the current SGW-U 26 allocated for the UE 18, i.e. the SGW-U 26 that was used the last time the UE 18 was in CONNECTED, can serve the current TA. So, during the Service Request procedure, the SGW-U 26 may have to be relocated to a new SGW-U 26 which serves the current TA of the UE 18. This means that the Service Request procedure is modified from the conventional Service Request procedure where the SGW was never changed during the conventional Service Request procedure.

Figure 9:
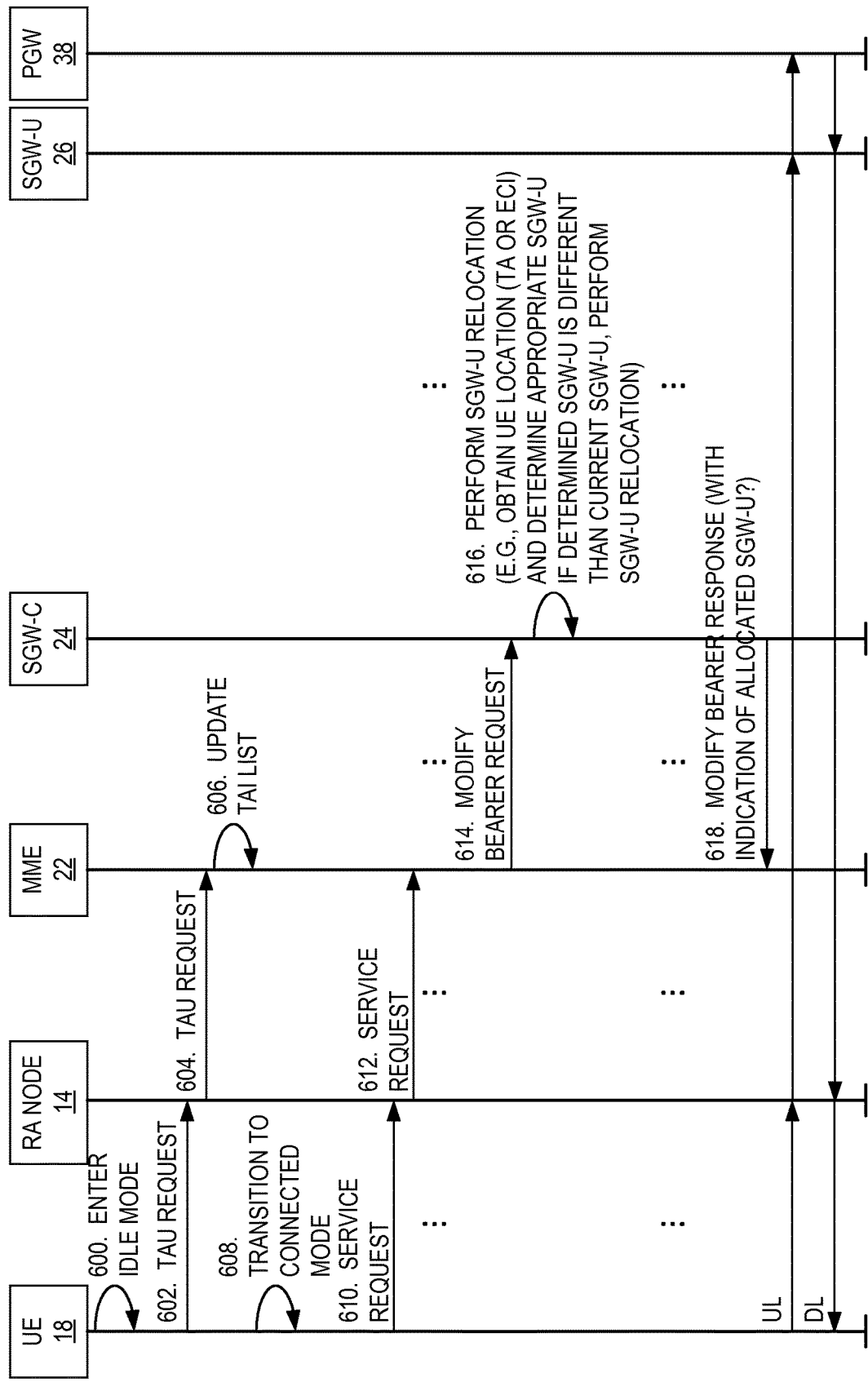
FIG. 9 illustrates yet another solution according to some embodiments of the present disclosure.

FIG. 9 illustrates one example of Solution 4. As illustrated, the UE 18 enters IDLE mode (step 600). While in IDLE mode, the UE 18 moves from one TA to another and, as such, sends a TAU request to the MME 22 via the radio access node 14 (steps 602 and 604). The MME 22 updates the TAI List of the UE 18 to include the TAI of the current TA of the UE 18 as indicated in the TAU request (step 606).

At some point, the UE 18 transitions to CONNECTED mode (step 608) and sends a service request to the MME 22 via the radio access node 14 (steps 610 and 612). The service request procedure is then performed. During the service request procedure, the MME 22 sends a modify bearer request to the SGW-C 24 (step 614). The SGW-C 24, upon receiving the modify bearer request, performs a SGW-U relocation procedure to select a new SGW-U 26 for the UE 18 if needed (step 616). More specifically, the SGW-C 24 obtains the location of the UE 18 (e.g., the TAI of the current TA of the UE 18). The location of the UE 18 may, for example, be included in the modify bearer request. The SGW-C 24 determines or selects an appropriate SGW-U 26 for the UE 18 based on the location of the UE 18 (e.g., a SGW-U 26 that serves the current TA of the UE 18). If the determined SGW-U 26 is different than the current SGW-U 26 of the UE 18, then the SGW-C 24 relocates the UE 18 to the determined SGW-U 26. At some point thereafter, the SGW-C 24 sends an indication to the MME 22 of the SGW-U 26 allocated to the UE 18, which is a new SGW-U 26 if SGW-U 26 relocation was performed (step 618). As an example, this indication may be included in a modify bearer response. As discussed above, the indication may include the SGW-U 26 IP address and TEID(s).

Even though Solution 4 may seem attractive from a conceptual point of view, it goes against the current principle in EPC that the SGW resources (e.g., UP TEID) are always ready to be used when a UE 18 transitions from IDLE to ACTIVE state. It is currently not possible to modify SGW TEIDs (i.e., re-select the SGW UP) during the Service Request procedure. Solution 4 thus requires additional S11 signaling and latency during every Service Request procedure in order to interact with SGW-C 24 before the MME 22 informs the eNB (i.e., radio access node 14) about SGW TEIDs.

Figure 10:
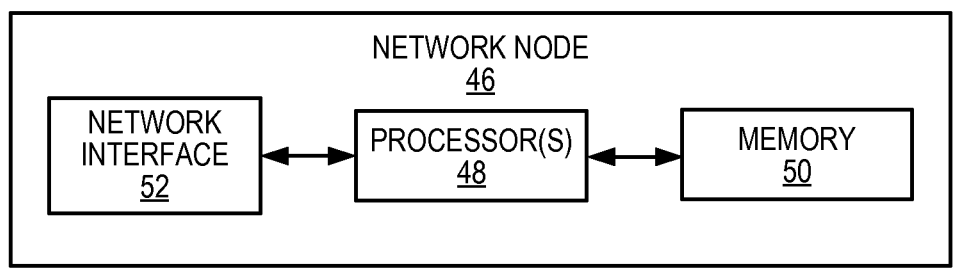
FIGS. 10 and 11 illustrate embodiments of a network node according to some embodiments of the present disclosure.

FIG. 10 is a block diagram of a network node 46 according to some embodiments of the present disclosure. As illustrated, the network node 46 includes one or more processors 48 (e.g., one or more Central Processing Units (CPUs), one or more Application Specific Integrated Circuits (ASIC), one or more Field Programmable Gate Arrays (FPGAs), and/or the like), memory 50, and a network interface 52 communicatively coupling the network node 46 to other network nodes. In some embodiments, the network node 46 implements the SGW-C 24. For example, the functionality of the SGW-C 24 according to any of the embodiments described herein may be implemented in software that is stored in the memory 50 and executed by the one or more processors 48. In other embodiments, the network node 46 implements the MME 22. For example, the functionality of the MME 22 according to any of the embodiments described herein may be implemented in software that is stored in the memory 50 and executed by the one or more processors 48. However, the network node 46 may be any network node (e.g., any core network node) in the cellular communications system 10.

In some embodiments, a computer program including instructions which, when executed by at least one processor, causes the at least one processor to carry out the functionality of the network node 46 (e.g., SGW-C 24 or MME 22) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 11:
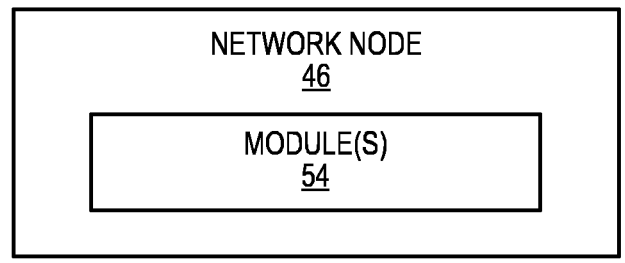

FIG. 11 is a block diagram of the network node 46 according to some other embodiments of the present disclosure. The network node 46 includes one or more modules 54, each of which is implemented in software. In some embodiments, the network node 46 implements the SGW-C 24, and the module(s) 54 operate to provide the functionality the SGW-C 24 according to any of the embodiments described herein. In other embodiments, the network node 46 implements the MME 22, and the module(s) 54 operate to provide the functionality the MME 22 according to any of the embodiments described herein.

Figure 12:
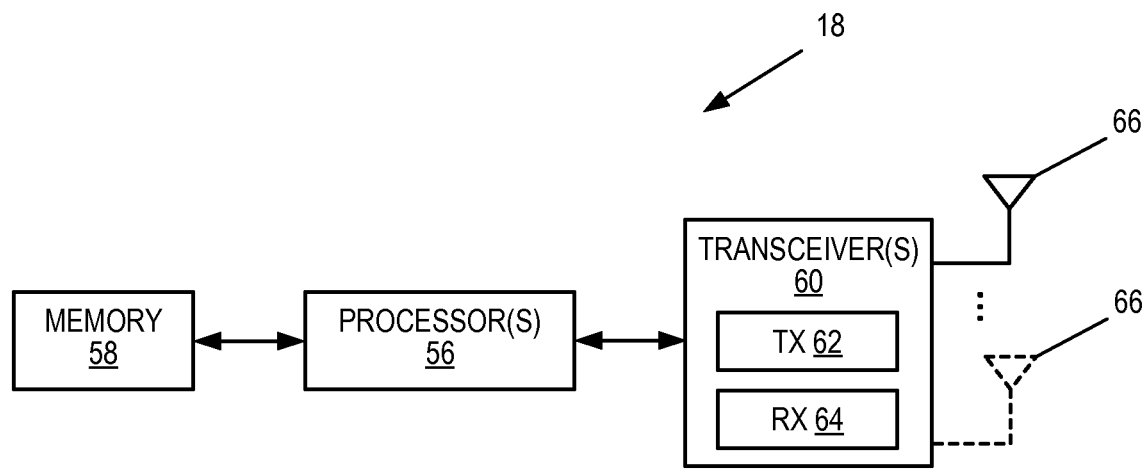
FIGS. 12 and 13 illustrate embodiments of a UE according to some embodiments of the present disclosure.

FIG. 12 is a schematic block diagram of the UE 18 (or more generally a wireless device) according to some embodiments of the present disclosure. As illustrated, the UE 18 includes one or more processors 56 (e.g., CPUs, ASICs, FPGAs, and/or the like), memory 58, and one or more transceivers 60 each including one or more transmitters 62 and one or more receivers 64 coupled to one or more antennas 66. In some embodiments, the functionality of the UE 18 described above may be fully or partially implemented in software that is, e.g., stored in the memory 58 and executed by the processor(s) 56.

In some embodiments, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
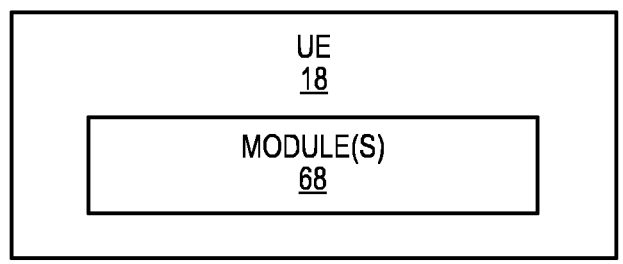

FIG. 13 is a schematic block diagram of the UE 18 (or more generally a wireless device) according to some other embodiments of the present disclosure. The UE 18 includes one or more modules 68, each of which is implemented in software. The module(s) 68 provide the functionality of the UE 18 described herein.

The following provides some example embodiments of the present disclosure. Note, however, that these embodiments are only examples.

Solution 1

Embodiment 1

A cellular communications system, comprising:
a Serving Gateway Control plane entity, SGW-C;
a plurality of SGW User Plane, SGW-UP, pools each comprising one or more SGW User entities, SGW-Us, wherein each SGW-UP pool has a respective SGW-UP Service Area;
a plurality of Mobility Management Entity, MME, pools each comprising one or more MME entities, wherein each MME pool has a respective MME coverage area that is completely within the SGW-UP Service Area of one of the plurality of SGW-UP pools.

Embodiment 2

The cellular communications system of embodiment 1 wherein there is a 1:1 mapping between SGW Service Areas and MME coverage areas.

Embodiment 3

The cellular communications system of embodiment 1 or 2 wherein, for each SGW-UP pool, SGW-U resources provided by the one or more SGW-Us in the SGW-UP pool can serve all Tracking Areas, TAs, within the SGW-UP Service Area.

Embodiment 4

The cellular communications system of any of embodiments 1-3 wherein SGW-U allocation is optimized.

Embodiment 5

The cellular communications system of embodiment 4 wherein, upon the SGW-C determining that SGW-U relocation for a User Equipment device, UE, is beneficial:
 the SGW-U sends an indication of the SGW-U relocation to an MME entity allocated to the UE (e.g., in a Modify Bearer Response message during a Service Request Procedure).

Embodiment 6

The cellular communications system of embodiment 4 wherein, upon the SGW-C determining that SGW-U relocation for a UE is beneficial, the SGW-C initiates a SGW-U relocation for the UE.

Embodiment 7

The cellular communications system of any of embodiments 1-6 wherein the SGW-C is informed about what MME pool is used so that the SGW-C can select a SGW-U function within the corresponding Service Area.

Solution 2A

Embodiment 8

A method of operation of a Mobility Management Entity, MME, in a cellular communications system, the cellular communications system having an architecture in which Serving Gateway, SGW, user plane functionality is separated from SGW control plane functionality, comprising:
 receiving, from a SGW Control plane entity, SGW-C, a SGW User Plane entity, SGW-UP, Identity of a SGW User entity, SGW-U; and
 obtaining a list of Tracking Areas, TAs, served by the SGW-U using the SGW-U Identity of the SGW-U.

Embodiment 9

The method of embodiment 8 wherein the SGW-U Identity of the SGW-U is a Fully Qualified Domain Name, FQDN, of the SGW-U, and obtaining the list of TAs served by the SGW-U comprises retrieving the list of TAs served by the SGW-U from a Domain Name System, DNS, using the FQDN of the SGW-U.

Embodiment 10

The method of embodiment 8 or 9 wherein the SGW-U is an SGW-U selected for a User Equipment device, UE, and the method further comprises populating a TA Identifier, TAI, List of the UE using the list of TAs served by the SGW-U.

Embodiment 11

The method of embodiment 8 wherein the SGW-U is a SGW-U selected for a UE, and the method further comprises:
 receiving a TA Update, TAU, request for the UE;
 determining whether a TA indicated by the TAU request is served by the SGW-U selected for the UE; and
 if the TA indicated by the TAU request is not served by the SGW-U selected for the UE, performing a SGW-U relocation procedure for the UE.

Embodiment 12

The method of embodiment 11 wherein performing the SGW-U relocation procedure for the UE comprises:
 deleting the TAI List of the UE and starting a new TAI List for the UE; and
 sending an indication to the SGW-C that a new SGW-U needs to be selected for the UE based on the TA indicated by the TAU request.

Embodiment 13

A Mobility Management Entity, MME, in a cellular communications system, the cellular communications system having an architecture in which Serving Gateway, SGW, user plane functionality is separated from SGW control plane functionality, the MME being adapted to operate according to the method of any of embodiments 8-10.

Embodiment 14

A Mobility Management Entity, MME, in a cellular communications system, the cellular communications system having an architecture in which Serving Gateway, SGW, user plane functionality is separated from SGW control plane functionality, the MME comprising:
 a means for receiving, from a SGW Control plane entity, SGW-C, a SGW User Plane entity, SGW-UP, identity of a SGW User entity, SGW-U; and
 a means for obtaining a list of Tracking Areas, TAs, served by the SGW-U using the SGW-U Identity of the SGW-U.

Embodiment 15

A Mobility Management Entity, MME, in a cellular communications system, the cellular communications system having an architecture in which Serving Gateway, SGW, user plane functionality is separated from SGW control plane functionality, the MME comprising:
 a receiving module operable to receive, from a SGW Control plane entity, SGW-C, a SGW User Plane entity, SGW-UP, identity of a SGW User entity, SGW-U; and
 an obtaining module operable to obtain a list of Tracking Areas, TAs, served by the SGW-U using the SGW-U Identity of the SGW-U.

Embodiment 16

A computer program comprising instructions which, when executed on at least one processor, cause the at least one processor to carry out the method according to any one of embodiments 8-12.

Embodiment 17

A carrier containing the computer program of embodiment 16, wherein the carrier is one of an electronic signal, an optical signal, a radio signal, or a computer readable storage medium.

Solution 2B(1)

Embodiment 18

A method of operation of a Mobility Management Entity, MME, in a cellular communications system, the cellular communications system having an architecture in which Serving Gateway, SGW, user plane functionality is separated from SGW control plane functionality, comprising:
  receiving, from a SGW Control plane entity, SGW-C, an indication that a new SGW User Plane entity, SGW-UP, has been selected for a User Equipment device, UE; and
  upon receiving the indication, clearing a Tracking Area Identifier, TAI, List of the UE.

Embodiment 19

A Mobility Management Entity, MME, in a cellular communications system, the cellular communications system having an architecture in which Serving Gateway, SGW, user plane functionality is separated from SGW control plane functionality, the MME being adapted to operate according the method of embodiment 18.

Embodiment 20

A Mobility Management Entity, MME, in a cellular communications system, the cellular communications system having an architecture in which Serving Gateway, SGW, user plane functionality is separated from SGW control plane functionality, the MME comprising:
  means for receiving, from a SGW Control plane entity, SGW-C, an indication that a new SGW User Plane entity, SGW-UP, has been selected for a User Equipment device, UE; and
  means for, upon receiving the indication, clear a Tracking Area Identifier, TAI, List of the UE.

Embodiment 21

A Mobility Management Entity, MME, in a cellular communications system, the cellular communications system having an architecture in which Serving Gateway, SGW, user plane functionality is separated from SGW control plane functionality, the MME comprising:
  a receiving module operable to receive, from a SGW Control plane entity, SGW-C, an indication that a new SGW User Plane entity, SGW-UP, has been selected for a User Equipment device, UE; and
  a Tracking Area Identifier, TAI, list clearing module operable to, upon receiving the indication, clear a TAI List of the UE.

Embodiment 22

A computer program comprising instructions which, when executed on at least one processor, cause the at least one processor to carry out the method according to embodiment 18.

Embodiment 23

A carrier containing the computer program of embodiment 22, wherein the carrier is one of an electronic signal, an optical signal, a radio signal, or a computer readable storage medium.

Solution 2B(2)

Embodiment 24

A method of operation of a Mobility Management Entity, MME, in a cellular communications system, the cellular communications system having an architecture in which Serving Gateway, SGW, user plane functionality is separated from SGW control plane functionality, comprising:
  providing a current Tracking Area Identifier, TAI, List of a User Equipment device, UE, to a SGW Control plane entity, SGW-C; and
  receiving an indication of a resulting TAI List for the UE, the resulting TAI List resulting from a SGW User entity, SGW-U, relocation procedure performed by the SGW-C for the UE.

Embodiment 25

A Mobility Management Entity, MME, in a cellular communications system, the cellular communications system having an architecture in which Serving Gateway, SGW, user plane functionality is separated from SGW control plane functionality, the MME being adapted to operate according the method of embodiment 24.

Embodiment 26

A Mobility Management Entity, MME, in a cellular communications system, the cellular communications system having an architecture in which Serving Gateway, SGW, user plane functionality is separated from SGW control plane functionality, the MME comprising:
  means for providing a current Tracking Area Identifier, TAI, List of a User Equipment device, UE, to a SGW Control plane entity, SGW-C; and
  means for receiving an indication of a resulting TAI List for the UE, the resulting TAI List resulting from a SGW User entity, SGW-U, relocation procedure performed by the SGW-C for the UE.

Embodiment 27

A Mobility Management Entity, MME, in a cellular communications system, the cellular communications system having an architecture in which Serving Gateway, SGW, user plane functionality is separated from SGW control plane functionality, the MME comprising:
  a providing module operable to provide a current Tracking Area Identifier, TAI, List of a User Equipment device, UE, to a SGW Control plane entity, SGW-C; and a receiving module operable to receive an indication of a resulting TAI List for the UE, the resulting TAI List resulting from a SGW User entity, SGW-U, relocation procedure performed by the SGW-C for the UE.

Embodiment 28

A computer program comprising instructions which, when executed on at least one processor, cause the at least one processor to carry out the method according to embodiment 24.

Embodiment 29

A carrier containing the computer program of embodiment 28, wherein the carrier is one of an electronic signal, an optical signal, a radio signal, or a computer readable storage medium.

Embodiment 30

A method of operation of a Serving Gateway Control plane entity, SGW-C, in a cellular communications system, the cellular communications system having an architecture in which SGW user plane functionality is separated from SGW control plane functionality, comprising:
receiving a current Tracking Area Identity, TAI, List of a User Equipment device, UE, from a Mobility Management Entity, MME;
selecting a new SGW User entity, SGW-U, for the UE;
determining whether the new SGW-U of the UE supports all Tracking Areas, TAs, in the current TAI List of the UE; and
based on the determining, providing a resulting TAI List for the UE to the MME.

Embodiment 31

A Serving Gateway Control plane entity, SGW-C, in a cellular communications system, the cellular communications system having an architecture in which SGW user plane functionality is separated from SGW control plane functionality, the SGW-C being adapted to operate according the method of embodiment 30.

Embodiment 32

A Serving Gateway Control plane entity, SGW-C, in a cellular communications system, the cellular communications system having an architecture in which SGW user plane functionality is separated from SGW control plane functionality, the SGW-C comprising:
means for receiving a current Tracking Area Identity, TAI, List of a User Equipment device, UE, from a Mobility Management Entity, MME;
means for selecting a new SGW User entity, SGW-U, for the UE;
means for determining whether the new SGW-U of the UE supports all Tracking Areas, TAs, in the current TAI List of the UE; and
means for, based on the determining, providing a resulting TAI List for the UE to the MME.

Embodiment 33

A Serving Gateway Control plane entity, SGW-C, in a cellular communications system, the cellular communica-
tions system having an architecture in which SGW user plane functionality is separated from SGW control plane functionality, the SGW-C comprising:
a receiving module operable to receive a current Tracking Area Identity, TAI, List of a User Equipment device, UE, from a Mobility Management Entity, MME;
a selection module operable to select a new SGW User entity, SGW-U, for the UE;
a determining module operable to determine whether the new SGW-U of the UE supports all Tracking Areas, TAs, in the current TAI List of the UE; and
a providing module operable to, based on the determining, provide a resulting TAI List for the UE to the MME.

Embodiment 34

A computer program comprising instructions which, when executed on at least one processor, cause the at least one processor to carry out the method according to embodiment 30.

Embodiment 35

A carrier containing the computer program of embodiment 34, wherein the carrier is one of an electronic signal, an optical signal, a radio signal, or a computer readable storage medium.

Solution 3

Embodiment 36

A cellular communications system, comprising:
a Serving Gateway Control plane entity, SGW-C, partitioned into a plurality of virtual SGW-Cs that correspond to a respective plurality of SGW User Plane, SGW-UP, Service Areas; and
a plurality of SGW-UP pools each comprising one or more SGW User entities, SGW-Us, wherein each SGW-UP pool serves a respective one of the plurality of SGW-UP Service Areas.

Solution 4

Embodiment 37

A cellular communications system, comprising:
a Serving Gateway Control plane entity, SGW-C;
a plurality of SGW User Plane, SGW-UP, pools each comprising one or more SGW User entities, SGW-Us, wherein each SGW-UP pool has a respective SGW-UP Service Area; and
a plurality of Mobility Management Entity, MME, pools each comprising one or more MME entities, wherein each MME pool has a respective MME coverage area that is completely within the SGW-UP Service Area of one of the plurality of SGW-UP pools;
wherein Tracking Area, TA, handling and SGW-UP selection are decoupled such that TA to SGW-U coupling for a User Equipment device, UE, is not guaranteed when the UE operates in IDLE mode.

Embodiment 38

The cellular communications system of embodiment 37 wherein, during a Service Request procedure performed in response to a Service Request from the UE, a SGW-U relocation procedure is performed for the UE.

The following acronyms are used throughout this disclosure.
- 3GPP Third Generation Partnership Project
- ASIC Application Specific Integrated Circuit
- CPU Central Processing Unit
- DNS Domain Name System
- ECI Enhanced Universal Terrestrial Radio Access Network Cell Identifier
- eNB Enhanced or Evolved Node B
- EPC Evolved Packet Core
- E-UTRAN Enhanced Universal Terrestrial Radio Access Network
- FPGA Field Programmable Gate Array
- FQDN Fully Qualified Domain Name
- ID Identity
- IE Information Element
- IP Internet Protocol
- IP-CAN Internet Protocol Connectivity Access Network
- LTE Long Term Evolution
- MME Mobility Management Entity
- PCEF Policy Control Enforcement Function
- PCRF Policy and Charging Rules Function
- PDN Packet Data Network
- PGW Packet Data Network Gateway
- RAN Radio Access Network
- RRC Radio Resource Control
- SA System Architecture
- SGW Serving Gateway
- TA Tracking Area
- TAI Tracking Area Identity
- TAU Tracking Area Update
- TEID Tunnel Endpoint Identification
- TR Technical Report
- UE User Equipment
- UP User Plane Those skilled in the art will recognize improvements and modifications to the embodiments of the present disclosure. All such improvements and modifications are considered within the scope of the concepts disclosed herein and the claims that follow.

What is claimed is:

1. A cellular communications system having an architecture in which Serving Gateway (SGW) user plane functionality is separated from SGW control plane functionality, the cellular communications system comprising:
   a Serving Gateway Control plane entity (SGW-C) partitioned into a plurality of virtual SGW-Cs that correspond to a respective plurality of SGW User Plane (SGW-UP) service areas; and
   a plurality of SGW-UP pools each comprising one or more SGW User entities (SGW-Us) wherein each SGW-UP pool serves a respective one of the plurality of SGW-UP service areas.

2. The cellular communications system of claim 1 wherein each virtual SGW-C of the plurality of virtual SGW-Cs is treated by a Mobility Management Entity (MME) as a legacy SGW.

3. The cellular communications system of claim 1 further comprising a MME operable to:
   receive an attach request or tracking area update request from a User Equipment device (UE) in a tracking area;
   obtain an indication of one of the plurality of virtual SGW-Cs that serves the tracking area; and
   communicate with the one of the plurality of virtual SGW-Cs to create a session between the UE and the one of the plurality of virtual SGW-Cs that serves the tracking area.

4. A network node implementing a Serving Gateway Control plane entity (SGW-C) for a cellular communications system, the cellular communications system having an architecture in which Serving Gateway (SGW) user plane functionality is separated from SGW control plane functionality, the network node comprising:
   at least one processor; and
   memory comprising instructions executable by the at least one processor whereby the network node is operable to:
   partition the SGW-C into a plurality of virtual SGW-Cs, the plurality of virtual SGW-Cs corresponding to a respective plurality of SGW User Plane (SGW-UP) service areas.

5. The network node of claim 4 wherein each virtual SGW-C of the plurality of virtual SGW-Cs is treated by a Mobility Management Entity (MME) as a legacy SGW.

* * * * *

UNITED STATES PATENT AND TRADEMARK OFFICE
CERTIFICATE OF CORRECTION

PATENT NO. : 10,560,914 B2
APPLICATION NO. : 16/069618
DATED : February 11, 2020
INVENTOR(S) : Rommer et al.

Page 1 of 1

It is certified that error appears in the above-identified patent and that said Letters Patent is hereby corrected as shown below:

In the Specification

In Column 6, Line 23, delete "separate of control" and insert -- separate control --, therefor.

In Column 16, Line 14, delete "functionality the" and insert -- functionality of the --, therefor.

In Column 16, Line 18, delete "functionality the" and insert -- functionality of the --, therefor.

In Column 19, Line 38, delete "according the" and insert -- according to the --, therefor.

In Column 20, Line 40, delete "according the" and insert -- according to the --, therefor.

In Column 21, Lines 43-44, delete "according the" and insert -- according to the --, therefor.

Signed and Sealed this
Twenty-third Day of June, 2020

Andrei Iancu
*Director of the United States Patent and Trademark Office*